United States Patent
Chen et al.

(10) Patent No.: US 10,244,253 B2
(45) Date of Patent: Mar. 26, 2019

(54) VIDEO CODING TECHNIQUES USING ASYMMETRIC MOTION PARTITIONING

(71) Applicant: QUALCOMM Incorporated, San Diego, CA (US)

(72) Inventors: Ying Chen, San Diego, CA (US); Li Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 782 days.

(21) Appl. No.: 14/483,983

(22) Filed: Sep. 11, 2014

(65) Prior Publication Data

US 2015/0078450 A1    Mar. 19, 2015

Related U.S. Application Data

(60) Provisional application No. 61/881,383, filed on Sep. 23, 2013, provisional application No. 61/877,793, filed on Sep. 13, 2013.

(51) Int. Cl.
*H04N 19/513* (2014.01)
*H04N 19/597* (2014.01)
(Continued)

(52) U.S. Cl.
CPC .......... *H04N 19/513* (2014.11); *H04N 19/52* (2014.11); *H04N 19/56* (2014.11); *H04N 19/577* (2014.11); *H04N 19/597* (2014.11); *H04N 19/70* (2014.11)

(58) Field of Classification Search
None
See application file for complete search history.

(56) References Cited

U.S. PATENT DOCUMENTS

2010/0306808 A1    12/2010    Neumeier et al.
2014/0168362 A1*   6/2014    Hannuksela ....... H04N 13/0048
                                                       348/43
(Continued)

FOREIGN PATENT DOCUMENTS

WO    WO 2013023005 A1 *   2/2013   ........... H04N 19/176

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.
(Continued)

*Primary Examiner* — Jeremiah C Hallenbeck-Huber
(74) *Attorney, Agent, or Firm* — Shumaker & Sieffert, P.A.

(57) ABSTRACT

Techniques for decoding video data include receiving residual data corresponding to a block of video data, wherein the block of video data is encoded using asymmetric motion partitioning, is uni-directionally predicted using backward view synthesis prediction (BVSP), and has a size of 16×12, 12×16, 16×4 or 4×16, partitioning the block of video data into sub-blocks, each sub-block having a size of 8×4 or 4×8, deriving a disparity motion vector for each of the sub-blocks from a corresponding depth block in a depth picture corresponding to a reference picture, synthesizing a respective reference block for each of the sub-blocks using the respective derived disparity motion vector, and decoding the block of video data by performing motion compensation on each of the sub-blocks using the residual data and the synthesized respective reference blocks.

30 Claims, 25 Drawing Sheets

(51) Int. Cl.
H04N 19/56 (2014.01)
H04N 19/52 (2014.01)
H04N 19/70 (2014.01)
H04N 19/577 (2014.01)

(56) References Cited

U.S. PATENT DOCUMENTS

| | | | | |
|---|---|---|---|---|
| 2014/0341306 | A1* | 11/2014 | Hendry | H04N 19/174 375/240.26 |
| 2015/0003521 | A1 | 1/2015 | Thirumalai et al. | |
| 2015/0003529 | A1 | 1/2015 | Thirumalai et al. | |

OTHER PUBLICATIONS

Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.
Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.
Bross et al., "WD4: Working Draft 4 of High-Efficiency Video Coding," 6th Meeting: Torino, IT, Jul. 14 through 22, 2011, (Joint Collaborative Team on Video Coding of ISO/IEC JTC1/SC29/WG11 and ITU-T SG.16); JCTVC-F803_d2, Oct. 4, 2011, 226 pp.
Bross et al., "WD5: Working Draft 5 of High-Efficiency Video Coding," 7th Meeting: Geneva, Switzerland, Nov. 21 through 30, 2011, (Joint Collaborative Team on Video Coding of ISO/IEC JTC1/SC29/WG11 and ITU-T SG.16);JCTVC-G1103_d2, Dec. 30, 2011, 214 pp.
Bross et al., "High efficiency video coding (HEVC) text specification draft 6," 8th Meeting: San Jose, CA, USA, Feb. 1 through 10, 2012, (Joint Collaborative Team on Video Coding of ISO/IEC JTC1/SC29/WG11 and ITU-T SG.16); JCTVC-H1003, Apr. 2, 2012, 259 pp.
Bross et al., "High efficiency video coding (HEVC) text specification draft 7," 9th Meeting: Geneva, CH, Apr. 27 through May 7, 2012, (Joint Collaborative Team on Video Coding of ISO/IEC JTC1/SC29/WG11 and ITU-T SG.16); JCTVC-I1003_d2, Jun. 1, 2012, 290 pp.
Bross et al., "High efficiency video coding (HEVC) text specification draft 8," 10th Meeting: Stockholm, SE, Jul. 11 through 20, 2012, (Joint Collaborative Team on Video Coding of ISO/IEC JTC1/SC29/WG11 and ITU-T SG.16); JCTVC-J1003_d7, Jul. 28, 2012, 261 pp.
Bross et al., "High efficiency video coding (HEVC) text specification draft 9," 11th Meeting: Shanghai, CN, Oct. 10 through 19, 2012, (Joint Collaborative Team on Video Coding of ISO/IEC JTC1/SC29/WG11 and ITU-T SG.16); JCTVC-K1003_v7, Nov. 2, 2012, 290 pp.
Bross et al., "High efficiency video coding (HEVC) text specification draft 10 (for FDIS & Last Call)," 12th Meeting: Geneva, CH, Jan. 14 through 23, 2013, (Joint Collaborative Team on Video Coding of ISO/IEC JTC1/SC29/WG11 and ITU-T SG.16); JCTVC-L1003_v34, Mar. 19, 2013, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 29, 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 13, 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 29, 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 29, 2015, 634 pp.
McCann et al., "High Efficiency Video Coding (HEVC) Test Model 10 (HM 10) Encoder Description", JCT-VC Meeting, MPEG Meeting, Geneva, Joint Collaborative Team on Video Coding of ISO/IEC JTC1/SC29/WG11 and ITU-T SG.16, JCTVC-L1002_v1, Jan. 14-23, 2013, XP030113947, Apr. 2, 2013, 37 pp.
Shimizu et al., "3D-CE1.h: Adaptive block partitioning for VSP," JCT-3V Meeting, Vienna; The Joint Collaborative Team on 3D Video Coding Extension Development of ISO /IEC JTC1/SC29/WG11 and ITU-T SG.16, JCT3V-E0207, Jul. 27-Aug. 2, 2013, XP030131250, Jul. 19, 2013, 3 pp.
Tech et al., "3D-HEVC Test Model 4", MPEG Meeting; Incheon; Motion Picture Expert Group or ISO/IEC JTC1/SC29/WG11 Coding of Moving Pictures and Audio, No. N13573, Apr. 22, 2013 XP030020321, Jun. 24, 2013, 53 pp.
Tian et al.,"CE1.h: Backward View Synthesis Prediction using Neighbouring Blocks," JCT-3V Meeting, The Joint Collaborative Team on 3D Video Coding Extension Development of ISO/IEC JTC1/SC29/WG11 and ITU-T SG.16, JCT3V-C0152, Jan. 16-23, 2013, XP030130568, Jan. 10, 2013, 5 pp.
Zhang et al., "CE1 related: BVSP for asymmetric motion partitioning," The Joint Collaborative Team on 3D Video Coding Extension Development of ISO/IEC JTC1/SC29/WG11 and ITU-T SG.16, JCT3V-F0130, Geneva, Oct. 25-Nov. 1, 2013, XP030131556, Oct. 18, 2013, 4 pp.
International Search Report and Written Opinion PCT/US2014/055456, dated Dec. 1, 2014, 11 pp.
ITU-T H.263, Series H: Audiovisual and Multimedia Systems, Infrastructure of audiovisual services—Coding of moving video, Video coding for low bit rate communication, The International Telecommunication Union, Jan. 2005, 226 pp.
ITU-T H.264, Series H: Audiovisual and Multimedia Systems, Infrastructure of audiovisual services—Coding of moving video, Advanced video coding for generic audiovisual services, The International Telecommunication Union, Mar. 2005, 343 pp.
Bross et al., "Editors' proposed corrections to HEVC version 1," Joint Collaborative Team on Video Coding (JCT-VC) of ITU-T SG16 WP3 and ISO/IEC JTC 1/SC 29/WG 11, Apr. 18-26, 2013, JTC1/SC29/WG11, 13th Meeting, Sep. 30, 2013, 310 pp.
Tech et al., "3D-HEVC Draft Text 5," Joint Collaborative Team on 3D Video Coding Extensions of ITU-T SG 16 WP 3 and ISO/IEC JTC 1/SC 29/WG 11, Jul. 27-Aug. 2, 2013, JCT3V-I1001-v-3, 9 Meeting, Sep. 11, 2013, 94 pp.
Zhang et al., "CE5.h: Disparity vector generation results," JCT2-A0097, JCT-3V Meeting MPEG Meeting; Stockholm, The Joint Collaborative Team on 3D Video Coding Extension Development of ISO/IEC JTC1/SC29/WG11 and ITU-T SG.16, Jul. 16-20, 2012, XP030130096, Jul. 10, 2012, 5 pp.
Sung et al., "3D-CE5.h: Simplification of disparity vector derivation for HEVC-based 3D video coding,", JCT-3V Meeting, MPEG Meeting, Stockholm, The Joint Collaborative Team on 3D Video Coding Extension Development of ISO/IECJTC1/SC29/WG11 and ITU-T SG.16, No. Jul. 16-20, 2012, JCT3V-A0126, XP030130125, Jul. 14, 2012, 4 pp.
Tian et al., "CE1.h: Backward View Synthesis Prediction using Neighbouring Blocks," Joint Collaborative Team on 3D Video Coding Extension Development of ITU-T SG 16 WP 3 and ISO/IEC JTC 1/SC 29/WG 11, Jan. 16-23, 2013, JCT3V-00152, 3 Meeting, Jan. 10, 2013, 5 pp.
International Preliminary Report on Patentability from International Application No. PCT/US2014/055456, dated Jan. 4, 2016, 7 pp.
Response to Written Opinion dated Dec. 1, 2014, from international application No. PCT/US2014/055456, filed Jul. 13, 2015, 5 pp.
Second Written Opinion of International Application No. PCT/US2014/055456, dated Aug. 6, 2015, 5 pp.
Response to Second Written Opinion dated Aug. 6, 2015, from International Application No. PCT/US2014/055456, dated Oct. 5, 2015, 5 pp.
Zhang et al., "3D-HEVC Test Model 5," Joint Collaborative Team on 3D Video Coding Extension Development of ITU-T SG 16 WP

(56) References Cited

OTHER PUBLICATIONS 3 and ISO/IEC JTC 1/SC 29/WG 11, Jul. 27, Aug. 2, 2013, JCT3V-E1005, 5 Meeting, May 19, 2014, 57 pp.
Zhang et al., "CE4: Advanced residual prediction for multiview coding," Joint Collaborative Team on 3D Video Coding Extensions of ITU-T SG 16 WP 3 and ISO/IEC JTC 1/SC 29/WG 11, Apr. 20-26, 2013, 4 Meeting, Incheon, Apr. 20, 2013, JCT3V-D0177_proposed_text_r1, 6 pp.
Chen et al., "Test Model 9 of 3D-HEVC an MV-HEVC," Joint Collaborative Team on 3D Video Coding Extension Development of ITU-T SG 16 WP 3 and ISO/IEC JTC 1/SC 29/WG 11, JCT3V-I1003, Jul. 3-9, 2014, 57 pp.
Kang et al., "3D-CE5.h related: Improvements for disparity vector derivation," JCT-3V Meeting, Shanghai, The Joint Collaborative Team on 3D Video Coding Extension Development of ISO/IEC JTC1/SC29/WG11 and ITU-T SG.16, Oct. 13-19, 2012 No. JCT3V-B0047, Oct. 10, 2012, XP030130228, 4 pp.
Kang et al., "CE2.h related: CU-based Disparity Vector Derivation in 3D-HEVC," Qualcomm Incorporated, JCT3V-D0181, Joint Collaborative Team on 3D Video Coding Extensions of ITU-T SG 16 WP 3 and ISO/IEC JTC 1/SC 29/WG 11, Apr. 20-26, 2013, 4th Meeting: Incheon, KR, Jul. 29, 2013, 4 pp.
Chang et al., "3D-CE2.h related: Simplified DV derivation for DoNBDV and BVSP," Joint Collaborative Team on 3D Video Coding Extensions of ITU-T SG 16 WP 3 and ISO/IEC JTC 1/SC 29/WG 11, 4 Meeting, Apr. 20-26, 2013 Incheon, Apr. 13, 2013, JCT3V-D0138, 4 pp.
An et al., "3D-CE3.h realted: Sub-PU level inter-view motion prediction," Joint Collaborative Team on 3D Video Coding Extensions of ITU-T SG 16 WP 3 and ISO/IEC JTC 1/SC 29/WG 11, Jul. 27-Aug. 2, 2013, 5 Meeting, Vienna, Jul. 19, 2013, JCT3V-E0184, 4 pp.
Tech et al., Joint Collaborative Team on 3D Video Coding Extension Development of ITU-T SG 16 WP 3 and ISO/IEC JTC 1/SC 29/WG 11, 5 Meeting, Vienna, Jul. 27-Aug. 2, 2013, JCT3V-E1001-v3, 89 pp.
Rusanovskyy et al., "Draft 4 of 3D-AVC Reference Software," Joint Collaborative Team on 3D Video Coding Extensions of ITU-T SG 16 WP 3 and ISO/IEC JTC 1/SC 29/WG 11, 9 Meeting, Sapporo, Jul. 3-9, 2014, JCT3V-I1005_r1, Sep. 17, 2014, 2 pp.
Zhang et al., "Proposed text for JCT3V-00049 based on 3DED-HEVC Test Model 2," Joint Collaborative Team on 3D Video Coding Extension Development of ITU-T SG 16 WP 3 and ISO/IEC JTC 1/SC 29/WG 11, 3 Meeting, Geneva, Jan. 17-23, 2013, JCT3V-00049_proposed text, 6 pp.
Zhang et al., "3D-Ce4: Advanced residual prediction for multiview coding," Joint Collaborative Team on 3D Video Coding Extension Development of ITU-T SG 16 WP 3 and ISO/IEC JTC 1/SC 29/WG 11, 3 Meeting, Geneva, Jan. 17-23, 2013, JCT3V-C0049, Jan. 10, 2013, 5 pp.
Zhang et al., "CE4: Advanced residual prediction for multiview coding," Joint Collaborative Team on 3D Video Coding Extensions of ITU-T SG 16 WP 3 and ISO/IEC JTC 1/SC 29/WG 11, 4 Meeting, Incheon, Apr. 20-26, 2013, JCT3V-D0177, Apr. 13, 2013, 9 pp.
Zhang et al., "CE4: Advanced residual prediction for multiview coding," Joint Collaborative Team on 3D Video Coding Extensions of ITU-T SG 16 WP 3 and ISO/IEC JTC 1/SC 29/WG 11, 4 Meeting, Incheon, Apr. 20-26, 2013, JCT3V-D0177_proposed_text, Apr. 13, 2013, 5 pp.
Tian et al., "CE1.h: Backward View Synthesis Prediction using Neighbouring Blocks," Joint Collaborative Team on 3D Video Coding Extension Development of ITU-T SG 16 WP 3 and ISO/IEC JTC 1/SC 29/WG 11, 3 Meeting, Geneva, Jan. 17-23, 2013, JCT3V_C0152, Jan. 15, 2013, 5 pp.
Tech et al., "3D-HEVC Test Model 2," Joint Collaborative Team on 3D Video Coding Extension Development of ITU-T SG 16 WP 3 and ISO/IEC JTC 1/SC 29/WG 11, 2 Meeting, Shanghai, Oct. 13-19, 2012, JCT3V-B1005-d0, 126 pp.
H.264, Series H: Audiovisual and Multimedia Systems Infrastructure of audiovisual services—Coding of moving video, Advanced video coding for generic audiovisual services, ITU-T, Mar. 2010, 669 pp.
Yuan Y., et al., "CE2: Non-Square Quadtree Transform for symmetric and asymmetric motion partition," Joint Collaborative Team on Video Coding of ITU-T SG16 WP3 and ISO/IEC JTC/SC29/WG11, 6th Meeting, Torino, Jul. 14-22, 2011, document No. JCTVC-F412, Jul. 2, 2011, 7 pages.
Silcock P., et al., "Extension of HM7 to Support Additional Chroma Formats", 10th JCT-VC Meeting; Jul. 11, 2012 to Jul. 20, 2012; Stockholm, SE (Joint Collaborative Team on Video Coding of ISO/IEC JTC1/SC29/WG11 and ITU-T SG.16); URL:http://wftp3.itu.int/av-arch/jctvc-site/, no.JCTVC-J0191, Jul. 2, 2012 (Jul. 2, 2012), XP030112553, pp. 1-16.

\* cited by examiner

| combIdx | 0 | 1 | 2 | 3 | 4 | 5 | 6 | 7 | 8 | 9 | 10 | 11 |
|---|---|---|---|---|---|---|---|---|---|---|---|---|
| l0CandIdx | 0 | 1 | 0 | 2 | 1 | 2 | 0 | 3 | 1 | 3 | 2 | 3 |
| l1CandIdx | 1 | 0 | 2 | 0 | 2 | 1 | 3 | 0 | 3 | 1 | 3 | 2 |

FIG. 8 SPATIAL AND TEMPORAL NEIGHORING BLOCKS RELATIVE TO THE CURRENT CODING UNIT

| combIdx | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| l0CandIdx | 0 | 1 | 0 | 2 | 1 | 2 | 0 | 3 | 1 | 3 | 2 | 3 | 0 | 4 | 1 | 4 | 2 | 4 | 3 | 4 |
| l1CandIdx | 1 | 0 | 2 | 0 | 2 | 1 | 3 | 0 | 3 | 1 | 3 | 2 | 4 | 0 | 4 | 1 | 4 | 2 | 4 | 3 |

FIG. 12

VIDEO CODING TECHNIQUES USING ASYMMETRIC MOTION PARTITIONING

This application claims the benefit of U.S. Provisional Application No. 61/877,793, filed Sep. 13, 2013, and U.S. Provisional Application No. 61/881,383, filed Sep. 23, 2013, the entire content of both of which is incorporated by reference herein.

TECHNICAL FIELD

This disclosure relates to video coding, i.e., encoding or decoding of video data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure relates to three-dimensional (3D) video coding based on advanced codecs, including, in some examples, depth coding techniques. This disclosure describes techniques for view synthesis prediction coding, including the determination of block sizes, when used in conjunction with asymmetric motion partitioning. This disclosure also describes techniques for advance motion prediction when used in conjunction with asymmetric motion partitioning.

In one example of the disclosure, a method of decoding video data comprises receiving residual data corresponding to a block of video data, wherein the block of video data is encoded using asymmetric motion partitioning, is uni-directionally predicted using backward view synthesis prediction (BVSP), and has a size of 16×12, 12×16, 16×4 or 4×16, partitioning the block of video data into sub-blocks, each sub-block having a size of 8×4 or 4×8, deriving a respective disparity motion vector for each of the sub-blocks from a corresponding depth block in a depth picture corresponding to a reference picture, synthesizing a respective reference block for each of the sub-blocks using the respective derived disparity motion vectors, and decoding the block of video data by performing motion compensation on each of the sub-blocks using the residual data and the synthesized respective reference blocks.

In another example of the disclosure, a method of encoding video data comprises generating a block of video data using asymmetric motion partitioning, wherein the block of video data is uni-directionally predicted using backward view synthesis prediction (BVSP), and has a size of 16×12, 12×16, 16×4 or 4×16, partitioning the block of video data into sub-blocks, each sub-block having a size of 8×4 or 4×8, deriving a respective disparity motion vector for each of the sub-blocks from a corresponding depth block in a depth picture corresponding to a reference picture, synthesizing a respective reference block for each of the sub-blocks using the respective derived disparity motion vectors, and encoding the block of video data by performing motion compensation on each of the sub-blocks using the synthesized respective reference blocks.

In another example of the disclosure, an apparatus configured to decode video data comprises a video memory configured to store information corresponding to a block of video data, and one or more processors configured to receive residual data corresponding to the block of video data, wherein the block of video data is encoded using asymmetric motion partitioning, is uni-directionally predicted using backward view synthesis prediction (BVSP), and has a size of 16×12, 12×16, 16×4 or 4×16, partition the block of video data into sub-blocks, each sub-block having a size of 8×4 or 4×8, derive a respective disparity motion vector for each of the sub-blocks from a corresponding depth block in a depth picture corresponding to a reference picture, synthesize a respective reference block for each of the sub-blocks using the respective derived disparity motion vectors, and decode the block of video data by performing motion compensation on each of the sub-blocks using the residual data and the synthesized respective reference blocks.

In another example of the disclosure, an apparatus configured to decode video data comprises means for receiving residual data corresponding to a block of video data, wherein the block of video data is encoded using asymmetric motion partitioning, is uni-directionally predicted using backward view synthesis prediction (BVSP), and has a size of 16×12, 12×16, 16×4 or 4×16, means for partitioning the block of video data into sub-blocks, each sub-block having a size of 8×4 or 4×8, means for deriving a respective disparity motion vector for each of the sub-blocks from a corresponding depth block in a depth picture corresponding to a reference picture, means for synthesizing a respective reference block for each of the sub-blocks using the respective derived disparity motion vectors, and means for decoding the block of video data by performing motion compensation on each of the sub-blocks using the residual data and the synthesized respective reference blocks.

The details of one or more examples of the disclosure are set forth in the accompanying drawings and the description below. Other features, objects, and advantages will be apparent from the description, drawings, and claims

BRIEF DESCRIPTION OF DRAWINGS

FIG. 12 is table indicating an example specification of reference indices in 3D-HEVC.

DETAILED DESCRIPTION

In general, this disclosure describes techniques related to 3D video coding based on advanced codecs, including the coding of one or more views along with a depth block using the 3D-HEVC (High Efficiency Video Coding) codec. In particular, this disclosure describes techniques for further dividing prediction units (PUs) partitioned using asymmetric motion partitioning techniques into smaller sub-blocks. The techniques of this disclosure include techniques for deriving and/or inheriting motion vectors and disparity motion vectors for sub-blocks of PUs partitioned using asymmetric motion partitioning.

Figure 1:
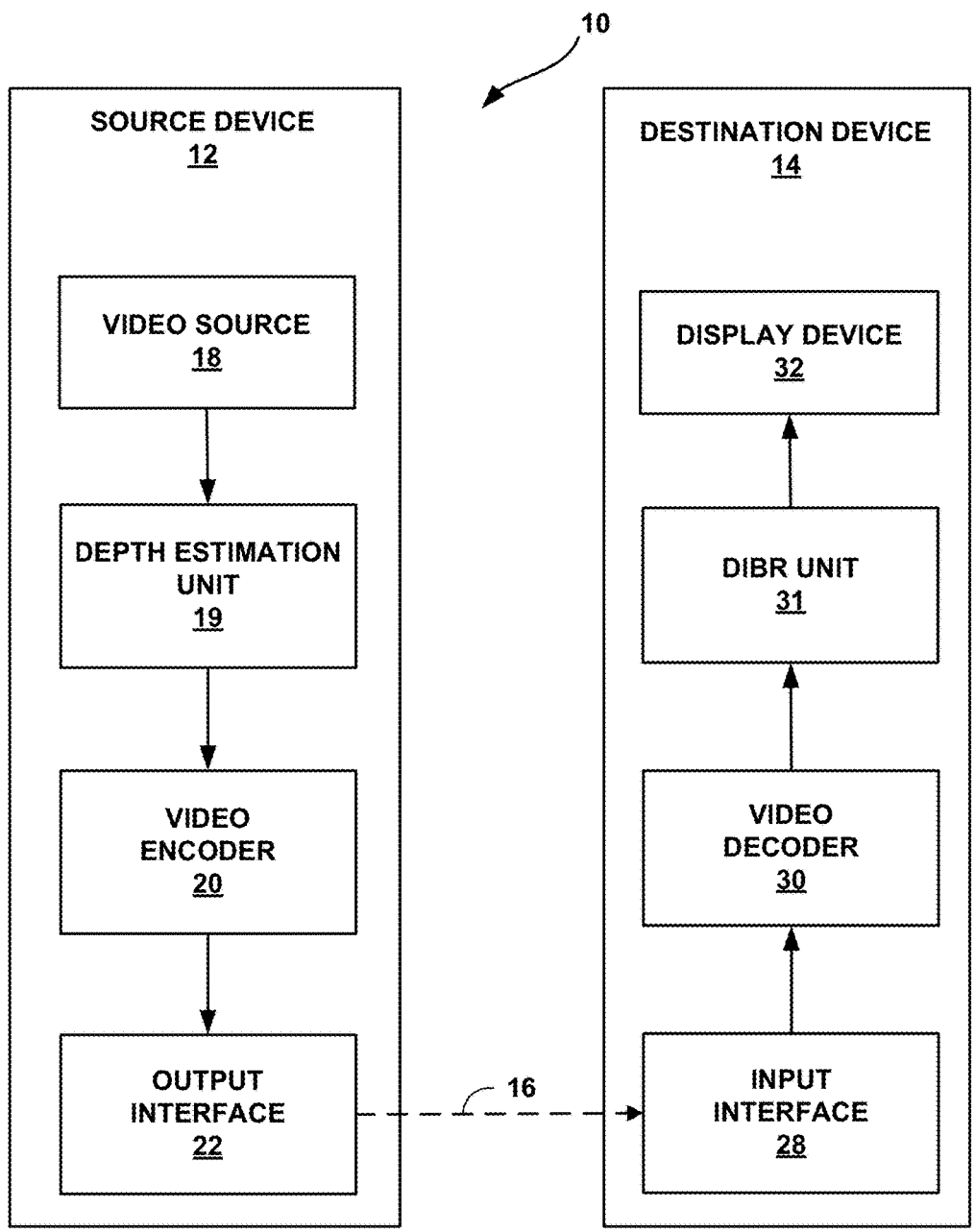
FIG. 1 is a block diagram illustrating an example video encoding and decoding system that may utilize the inter-prediction techniques of this disclosure.

FIG. 1 is a block diagram illustrating an example video encoding and decoding system 10 that may utilize techniques of this disclosure. As shown in FIG. 1, system 10 includes a source device 12 that provides encoded video data to be decoded at a later time by a destination device 14. In particular, source device 12 may provide video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, depth estimation unit 19, video encoder 20, and output interface 22. Destination device 14 includes input interface 28, video decoder 30, depth image based rendering (DIBR) unit 31, and display device 32. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. The techniques of this disclosure may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Video source 18 may provide one or more views of video data to video encoder 20. For example, video source 18 may correspond to an array of cameras, each having a unique horizontal position relative to a particular scene being filmed. Alternatively, video source 18 may generate video data from disparate horizontal camera perspectives, e.g., using computer graphics. Depth estimation unit 19 may be configured to determine values for depth pixels corresponding to pixels in a texture image. For example, depth estimation unit 19 may represent a Sound Navigation and Ranging (SONAR) unit, a Light Detection and Ranging (LIDAR) unit, or other unit capable of directly determining depth values substantially simultaneously while recording video data of a scene.

Additionally or alternatively, depth estimation unit 19 may be configured to calculate depth values indirectly by comparing two or more images that were captured at substantially the same time from different horizontal camera perspectives. By calculating horizontal disparity between substantially similar pixel values in the images, depth estimation unit 19 may approximate depth of various objects in the scene. Depth estimation unit 19 may be functionally integrated with video source 18, in some examples. For example, when video source 18 generates computer graphics images, depth estimation unit 19 may provide actual depth maps for graphical objects, e.g., using z-coordinates of pixels and objects used to render texture images.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device. In some examples, display device 32 may comprise a device capable of displaying two or more views simultaneously or substantially simultaneously, e.g., to produce a 3D visual effect for a viewer.

DIBR unit 31 of destination device 14 may render synthesized views using texture and depth information of decoded views received from video decoder 30. For example, DIBR unit 31 may determine horizontal disparity for pixel data of texture images as a function of values of pixels in corresponding depth maps. DIBR unit 31 may then generate a synthesized image by offsetting pixels in a texture image left or right by the determined horizontal disparity. In this manner, display device 32 may display one or more views, which may correspond to decoded views and/or synthesized views, in any combination. In accordance with the techniques of this disclosure, video decoder 30 may provide original and updated precision values for depth ranges and camera parameters to DIBR unit 31, which may use the depth ranges and camera parameters to properly synthesize views.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards, such as the MVC extension of ITU-T H.264/AVC. The latest joint draft of MVC is described in "Advanced video coding for generic audiovisual services," ITU-T Recommendation H.264, March 2010. In particular, video encoder 20 and video decoder 30 may operate according to 3D and/or multi-view coding standard, including a 3D extension of the HEVC standard (e.g., 3D-HEVC).

One draft of the HEVC standard, referred to as "HEVC Working Draft 10" or "WD10," is described in document JCTVC-L1003v34, Bross et al., "High efficiency video coding (HEVC) text specification draft 10 (for FDIS & Last Call)," Joint Collaborative Team on Video Coding (JCT-VC) of ITU-T SG16 WP3 and ISO/IEC JTC1/SC29/WG11, 12th Meeting: Geneva, C H, 14-23 Jan. 2013, which, as of Aug. 22, 2014, is downloadable from: http://phenix.int-evry.fr/jct/doc_end_user/documents/12_Geneva/wg11/JCTVC-L1003-v34.zip.

Another draft of the HEVC standard, is referred to herein as "WD10 revisions" described in Bross et al., "Editors' proposed corrections to HEVC version 1," Joint Collaborative Team on Video Coding (JCT-VC) of ITU-T SG16 WP3 and ISO/IEC JTC1/SC29/WG11, 13$^{th}$ Meeting, Incheon, K R, April 2013, which as of Aug. 22, 2014, is available from: http://phenix.int-evry.fr/jct/doc_end_user/documents/13_Incheon/wg11/JCTVC-M0432-v3.zip. A multiview extension to HEVC, namely MV-HEVC, is also being developed by the JCT-3V.

Currently, a Joint Collaboration Team on 3D Video Coding (JCT-3C) of VCEG and MPEG is developing a 3DV standard based on HEVC, for which part of the standardization efforts includes the standardization of the multiview video codec based on HEVC (MV-HEVC) and another part for 3D Video coding based on HEVC (3D-HEVC). For MV-HEVC, it should be guaranteed that there are only high-level syntax (HLS) changes in it, such that no module in the coding unit/prediction unit level in HEVC needs to be re-designed and can be fully reused for MV-HEVC. For 3D-HEVC, new coding tools, including those in coding unit/prediction unit level, for both texture and depth views may be included and supported.

One version software 3D-HTM for 3D-HEVC can be downloaded from the following link: [3D-HTM version 8.0]: https://hevc.hhi.fraunhofer.de/svn/svn_3DVCSoftware/tags/HTM-8.0/. One working draft of 3D-HEVC (document number: E1001) is available from: http://phenix.it-sudparis.eu/jct2/doc_end_user/current_document.php?id=1361. The latest software description (document number: E1005) is be available from: http://phenix.it-sudparis.eu/jct2/doc_end_user/current_document.php?id=1360.

A more recent version of the software 3D-HTM for 3D-HEVC can be downloaded from the following link: [3D-HTM version 12.0]: https://hevc.hhi.fraunhofer.de/svn/svn_3DVCSoftware/tags/HTM-12.0/. The corresponding working draft of 3D-HEVC (document number: I1001) is available from: http://phenix.int-evry.fr/jct3v/doc_end_user/current_document.php?id=2299. The latest software description (document number: I1005) is be available from: http://phenix.int-evry.fr/jct3v/doc_end_user/current_document.php?id=2301.

Initially, example coding techniques of HEVC will be discussed. The HEVC standardization efforts were based on an evolving model of a video coding device referred to as the HEVC Test Model (HM). The HM presumed several additional capabilities of video coding devices relative to existing devices according to, e.g., ITU-T H.264/AVC. For example, whereas H.264 provides nine intra-prediction encoding modes, the HM may provide as many as thirty-three angular intra-prediction encoding modes, plus DC and Planar modes.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples.

Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A coding unit (CU) may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. In some versions of HEVC, for the luma component of each PU, an intra prediction method is utilized with 33 angular prediction modes (indexed from 2 to 34), DC mode (indexed with 1) and Planar mode (indexed with 0).

If video encoder 20 uses inter prediction to generate the predictive blocks of a PU, video encoder 20 may generate the predictive blocks of the PU based on decoded samples of one or more pictures other than the picture associated with the PU. Inter prediction may be uni-directional inter prediction (i.e., uni-prediction or uni-predictive prediction) or bi-directional inter prediction (i.e., bi-prediction or bi-predictive prediction). To perform uni-prediction or bi-prediction, video encoder 20 may generate a first reference picture list (RefPicList0) and a second reference picture list (RefPicList1) for a current slice. Each of the reference picture lists may include one or more reference pictures. When using uni-prediction, video encoder 20 may search the reference pictures in either or both RefPicList0 and RefPicList1 to determine a reference location within a reference picture. Furthermore, when using uni-prediction, video encoder 20 may generate, based at least in part on samples corresponding to the reference location, the predictive sample blocks for the PU. Moreover, when using uni-prediction, video encoder 20 may generate a single motion vector that indicates a spatial displacement between a prediction block of the PU and the reference location. To indicate the spatial displacement between a prediction block of the PU and the reference location, a motion vector may include a horizontal component specifying a horizontal displacement between the prediction block of the PU and the reference location and may include a vertical component specifying a vertical displacement between the prediction block of the PU and the reference location.

When using bi-prediction to encode a PU, video encoder 20 may determine a first reference location in a reference picture in RefPicList0 and a second reference location in a reference picture in RefPicList1. Video encoder 20 may then generate, based at least in part on samples corresponding to the first and second reference locations, the predictive blocks for the PU. Moreover, when using bi-prediction to encode the PU, video encoder 20 may generate a first motion vector indicating a spatial displacement between a sample block of the PU and the first reference location and a second motion vector indicating a spatial displacement between the prediction block of the PU and the second reference location.

Typically a reference picture list construction for the first or the second reference picture list (e.g., RefPicList0 or RefPicList1) of a B picture includes two steps: reference picture list initialization and reference picture list reordering (modification). The reference picture list initialization is an explicit mechanism that puts the reference pictures in the reference picture memory (also known as decoded picture buffer) into a list based on the order of POC (Picture Order Count, aligned with display order of a picture) values. The reference picture list reordering mechanism can modify the position of a picture that was put in the list during the reference picture list initialization to any new position, or put any reference picture in the reference picture memory in any position even the picture doesn't belong to the initialized list. Some pictures after the reference picture list reordering (modification), may be put in a very further position in the list. However, if a position of a picture exceeds the number of active reference pictures of the list, the picture is not considered as an entry of the final reference picture list. The number of active reference pictures may be signaled in the slice header for each list.

After reference picture lists are constructed (namely RefPicList0 and RefPicList1, if available), a reference index to a reference picture list can be used to identify any reference picture included in the reference picture list.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block.

Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for SEI, and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In some examples, video encoder 20 may signal the motion information of a PU using merge mode or advanced motion vector prediction (AMVP) mode. In other words, in HEVC, there are two modes for the prediction of motion parameters, one being the merge mode and the other being AMVP. Motion prediction may comprise the determination of motion information of a video unit (e.g., a PU) based on motion information of one or more other video units. The motion information of a PU may include motion vector(s) of the PU and reference index(es) of the PU.

When video encoder 20 signals the motion information of a current PU using merge mode, video encoder 20 generates a merge candidate list. In other words, video encoder 20 may perform a motion vector predictor list construction process. The merge candidate list includes a set of merge candidates that indicate the motion information of PUs that spatially or temporally neighbor the current PU. That is, in the merge mode, a candidate list of motion parameters (e.g., reference indexes, motion vectors, etc.) is constructed where a candidate can be from spatial and temporal neighboring blocks. In some examples the candidates may also include an artificially generated candidate.

Furthermore, in merge mode, video encoder 20 may select a merge candidate from the merge candidate list and may use the motion information indicated by the selected merge candidate as the motion information of the current PU. Video encoder 20 may signal the position in the merge candidate list of the selected merge candidate. For instance, video encoder 20 may signal the selected motion vector parameters by transmitting an index into the candidate list. Video decoder 30 may obtain, from the bitstream, the index into the candidate list (i.e., a candidate list index). In addition, video decoder 30 may generate the same merge candidate list and may determine, based on the indication of the position of the selected merge candidate, the selected merge candidate. Video decoder 30 may then use the motion information of the selected merge candidate to generate predictive blocks for the current PU. That is, video decoder 30 may determine, based at least in part on the candidate list index, a selected candidate in the candidate list, wherein the selected candidate specifies the motion vector for the current PU. In this way, at the decoder side, once the index is decoded, all motion parameters of the corresponding block where the index points may be inherited by the current PU.

Skip mode is similar to merge mode. In skip mode, video encoder 20 and video decoder 30 generate and use a merge candidate list in the same way that video encoder 20 and video decoder 30 use the merge candidate list in merge mode. However, when video encoder 20 signals the motion information of a current PU using skip mode, video encoder 20 does not signal any residual data for the current PU. Accordingly, video decoder 30 may determine, without use of residual data, a predictive block for the PU based on a reference block indicated by the motion information of a selected candidate in the merge candidate list.

AMVP mode is similar to merge mode in that video encoder 20 may generate a candidate list and may select a candidate from the candidate list. However, when video encoder 20 signals the RefPicListX motion information of a current PU using AMVP mode, video encoder 20 may signal a RefPicListX motion vector difference (MVD) for the current PU and a RefPicListX reference index for the current PU in addition to signaling a RefPicListX MVP flag for the current PU. The RefPicListX MVP flag for the current PU may indicate the position of a selected AMVP candidate in the AMVP candidate list. The RefPicListX MVD for the current PU may indicate a difference between a RefPicListX motion vector of the current PU and a motion vector of the selected AMVP candidate. In this way, video encoder 20 may signal the RefPicListX motion information of the current PU by signaling a RefPicListX motion vector predictor (MVP) flag, a RefPicListX reference index value, and a RefPicListX MVD. In other words, the data in the bitstream representing the motion vector for the current PU may include data representing a reference index, an index to a candidate list, and an MVD.

Furthermore, when the motion information of a current PU is signaled using AMVP mode, video decoder 30 may obtain, from the bitstream, a MVD for a current PU and a MVP flag. Video decoder 30 may generate the same AMVP candidate list and may determine, based on the MVP flag, the selected AMVP candidate. Video decoder 30 may recover a motion vector of the current PU by adding the MVD to the motion vector indicated by the selected AMVP candidate. That is, video decoder 30 may determine, based on a motion vector indicated by the selected AMVP candidate and the MVD, the motion vector of the current PU. Video decoder 30 may then use the recovered motion vector or motion vectors of the current PU to generate predictive blocks for the current PU.

When video decoder 30 generates an AMVP candidate list for a current PU, video decoder 30 may derive one or more AMVP candidates based on the motion information of PUs (i.e., spatially-neighboring PUs) that cover locations that spatially neighbor the current PU. A PU may cover a location when a prediction block of the PU includes the location.

A candidate in a merge candidate list or an AMVP candidate list that is based on the motion information of a PU that temporally neighbors a current PU (i.e., a PU that is in a different time instance than the current PU) may be referred to as a TMVP. That is, a TMVP may be used to improve the coding efficiency of HEVC and, different from other coding tools, TMVP may need to access the motion vector of a frame in a decoded picture buffer, more specifically in a reference picture list.

The use of TMVPs may be enabled or disabled on a CVS-by-CVS (coded video sequence) basis, a slice-by-slice basis, or on another basis. A syntax element (e.g., sps_temporal_mvp_enable_flag) in a SPS may indicate whether the use of TMVPs is enabled for a CVS. Furthermore, when the use of TMVPs is enabled for a CVS, the use of TMVPs may be enabled or disabled for particular slices within the CVS. For instance, a syntax element (e.g., slice_temporal_mvp_enable_flag) in a slice header may indicate whether the use of TMVPs is enabled for a slice. Thus, in an inter predicted slice, when the TMVP is enabled for a whole CVS (e.g., sps_temporal_mvp_enable_flag in a SPS is set to 1), slice_temporal_mvp_enable_flag is signaled in the slice header to indicate whether TMVP is enabled for the current slice.

To determine a TMVP, a video coder may firstly identify a reference picture that includes a PU that is co-located with the current PU. In other words, the video coder may identify a co-located picture. If the current slice of the current picture is a B slice (i.e., a slice that is allowed to include bi-directionally inter predicted PUs), video encoder 20 may signal, in a slice header, a syntax element (e.g., collocated_from_l0_flag) that indicates whether the co-located picture is from RefPicList0 or RefPicList1. In other words, when the use of TMVPs is enabled for a current slice, and the current slice is a B slice (e.g., a slice that is allowed to include bi-directionally inter predicted PUs), video encoder 20 may signal a syntax element (e.g., collocated_from_l0_flag) in a slice header to indicate whether the co-located picture is in RefPicList0 or RefPicList1 In other words, to get a TMVP, firstly a co-located picture is to be identified. If the current picture is a B slice, a collocated_from_l0_flag is signaled in slice header to indicate whether the co-located picture is from RefPicList0 or RefPicList1.

After video decoder 30 identifies the reference picture list that includes the co-located picture, video decoder 30 may use another syntax element (e.g., collocated_ref_idx), which may be signaled in a slice header, to identify a picture (i.e., the co-located picture) in the identified reference picture list. That is, after a reference picture list is identified, collocated_ref_idx, signaled in a slice header is used to identify the picture in the reference picture list.

The video coder may identify a co-located PU by checking the co-located picture. The TMVP may indicate either the motion information of a right-bottom PU of the CU containing the co-located PU, or the motion information of the right-bottom PU within the center PUs of the CU containing this PU. Thus, either the motion of the right-bottom PU of the CU containing this PU, or the motion of the right-bottom PU within the center PUs of the CU containing this PU is used. The right-bottom PU of the CU containing the co-located PU may be a PU that covers a location immediately below and right of a bottom-right sample of a prediction block of the PU. In other words, the TMVP may indicate the motion information of a PU that is in the reference picture and that covers a location that is co-located with a bottom right corner of the current PU, or the TMVP may indicate the motion information of a PU that is in the reference picture and that covers a location that is co-located with a center of the current PU.

When motion vectors identified by the above process (i.e., motion vectors of a TMVP) are used to generate a motion candidate for merge mode or AMVP mode, the video coder may scale the motion vectors based on the temporal location (reflected by POC value). For instance, a video coder may increase the magnitude of a motion vector by greater amounts when a difference between the POC values of a current picture and a reference picture is greater than when a difference between the POC values of the current picture and the reference picture is less.

The target reference index of all possible reference picture lists for the temporal merging candidate derived from a TMVP may be always set to 0. However, for AMVP, the target reference index of all possible reference pictures is set equal to the decoded reference index. In other words, the target reference index of all possible reference picture lists for the temporal merging candidate derived from TMVP is always set to 0 while for AMVP, it is set equal to the decoded reference index. In HEVC, a SPS may include a flag (e.g., sps_temporal_mvp_enable_flag) and the slice header may include a flag (e.g., pic_temporal_mvp_enable_flag) when sps_temporal_mvp_enable_flag is equal to 1. When both pic_temporal_mvp_enable_flag and a temporal_id are equal to 0 for a particular picture, no motion vector from pictures before that particular picture in decoding order are used as a TMVP in decoding of the particular picture or a picture after the particular picture in decoding order.

In the next section, multiview (e.g., as in H.264/MVC) and multiview plus depth (e.g., as in 3D-HEVC) coding techniques will be discussed. Initially, MVC techniques will be discussed. As noted above, MVC is a multiview coding extension of ITU-T H.264/AVC. In MVC, data for a plurality of views is coded in time-first order, and accordingly, the decoding order arrangement is referred to as time-first coding. In particular, view components (that is, pictures) for each of the plurality of views at a common time instance may be coded, then another set of view components for a different time instance may be coded, and so on. An access unit may include coded pictures of all of the views for one output time instance. It should be understood that the decoding order of access units is not necessarily identical to the output (or display) order.

Figure 2:
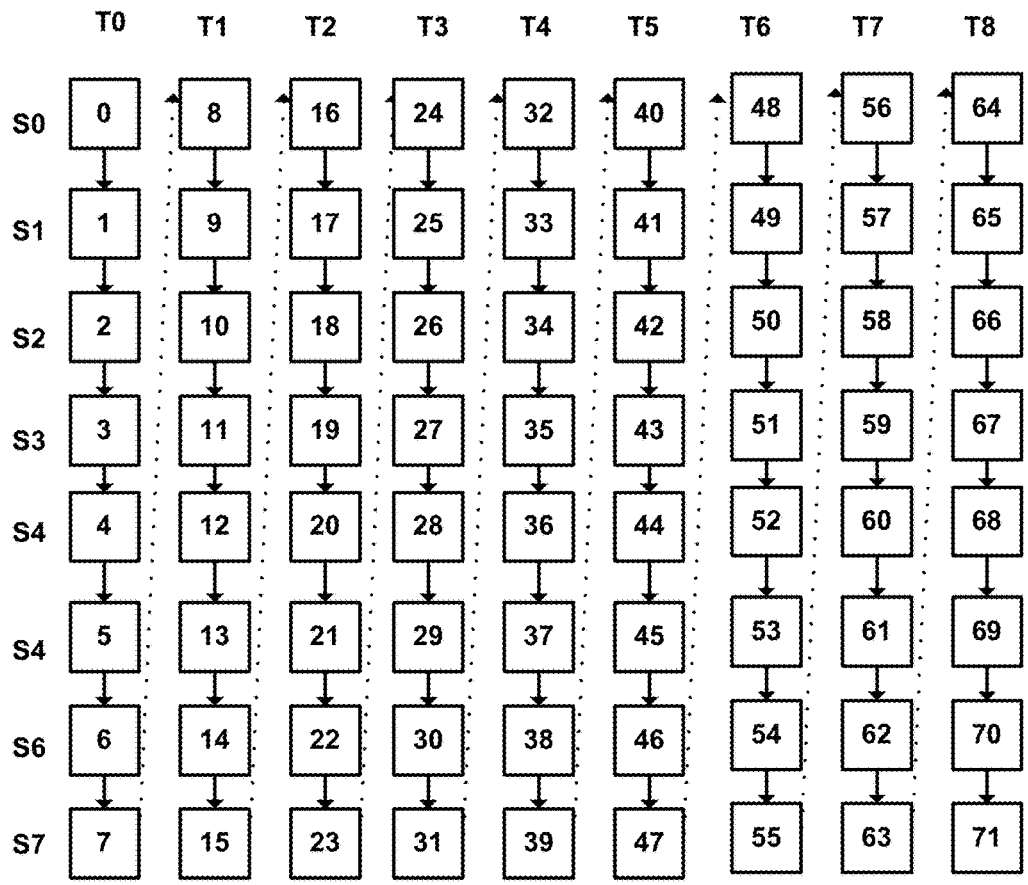
FIG. 2 is a conceptual diagram illustrating an example decoding order for multiview video.

A typical MVC decoding order (i.e., bitstream order) is shown in FIG. 2. The decoding order arrangement is referred as time-first coding. Note that the decoding order of access units may not be identical to the output or display order. In FIG. 2, S0-S7 each refers to different views of the multiview video. T0-T8 each represents one output time instance. An access unit may include the coded pictures of all the views for one output time instance. For example, a first access unit may include all of the views S0-S7 for time instance T0, a second access unit may include all of the views S0-S7 for time instance T1, and so forth.

For purposes of brevity, the disclosure may use the following definitions:

view component: A coded representation of a view in a single access unit. When a view includes both coded texture and depth representations, a view component consists of a texture view component and a depth view component.

texture view component: A coded representation of the texture of a view in a single access unit.

depth view component: A coded representation of the depth of a view in a single access unit.

In FIG. 2, each of the views includes sets of pictures. For example, view S0 includes set of pictures 0, 8, 16, 24, 32, 40, 48, 56, and 64, view S1 includes set of pictures 1, 9, 17, 25, 33, 41, 49, 57, and 65, and so forth. For 3D video coding, e.g., 3D-HEVC, each picture may include two component pictures: one component picture is referred to as a texture view component, and the other component picture is referred to as a depth view component. The texture view component and the depth view component within a set of pictures of a view may be considered as corresponding to one another. For example, the texture view component within a set of pictures of a view is considered as corresponding to the depth view component within the set of the pictures of the view, and vice-versa (i.e., the depth view component corresponds to its texture view component in the set, and vice-versa). As used in this disclosure, a texture view component that corresponds to a depth view component may be considered as the texture view component and the depth view component being part of a same view of a single access unit.

The texture view component includes the actual image content that is displayed. For example, the texture view component may include luma (Y) and chroma (Cb and Cr) components. The depth view component may indicate relative depths of the pixels in its corresponding texture view component. As one example, the depth view component is a gray scale image that includes only luma values. In other words, the depth view component may not convey any image content, but rather provide a measure of the relative depths of the pixels in the texture view component.

For example, a purely white pixel in the depth view component indicates that its corresponding pixel or pixels in the corresponding texture view component is closer from the perspective of the viewer, and a purely black pixel in the depth view component indicates that its corresponding pixel or pixels in the corresponding texture view component is further away from the perspective of the viewer. The various shades of gray in between black and white indicate different depth levels. For instance, a very gray pixel in the depth view component indicates that its corresponding pixel in the texture view component is further away than a slightly gray pixel in the depth view component. Because only gray scale is needed to identify the depth of pixels, the depth view component need not include chroma components, as color values for the depth view component may not serve any purpose.

The depth view component using only luma values (e.g., intensity values) to identify depth is provided for illustration purposes and should not be considered limiting. In other examples, any technique may be utilized to indicate relative depths of the pixels in the texture view component.

Figure 3:
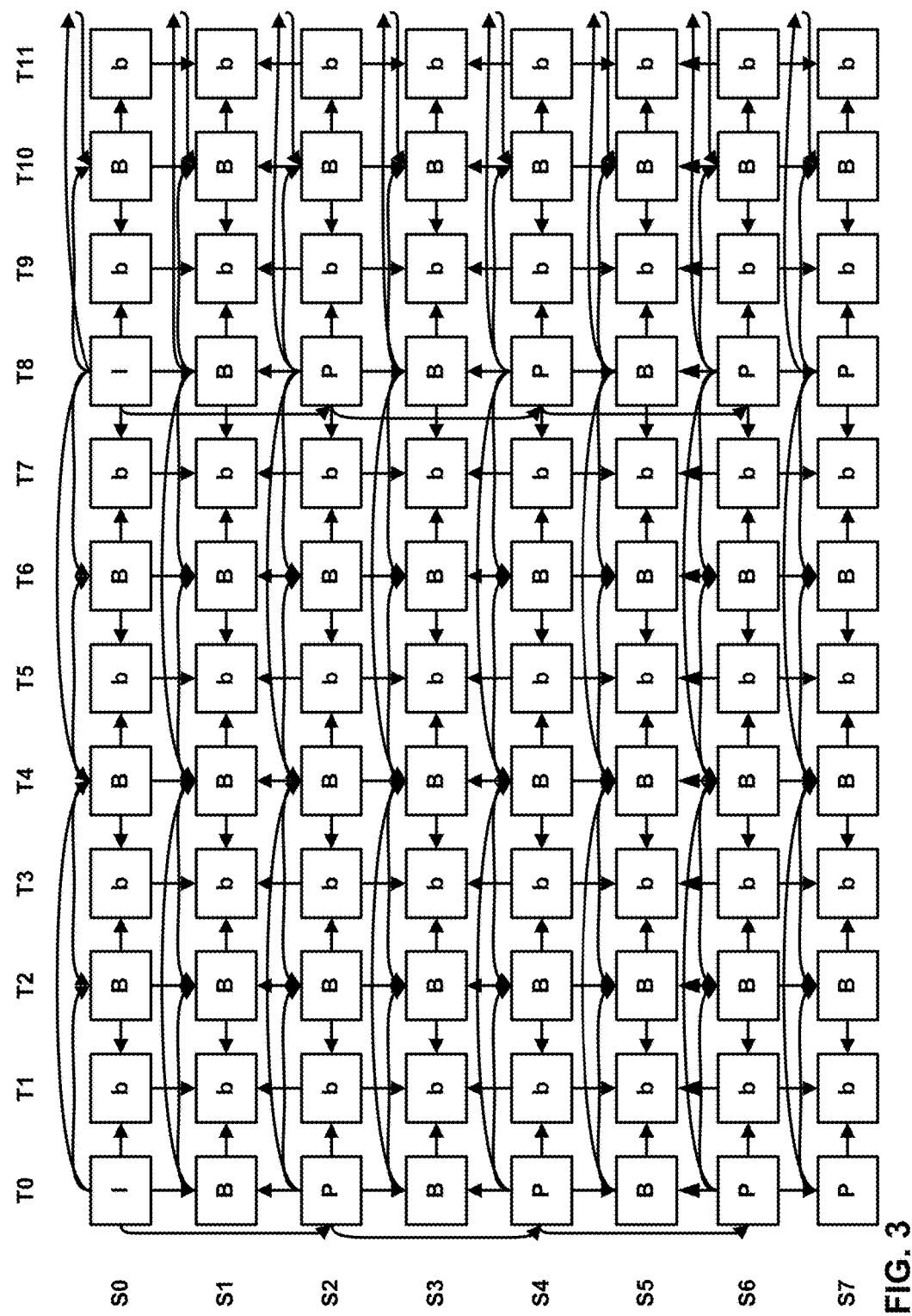
FIG. 3 is a conceptual diagram illustrating an example prediction structure for multi-view video.

A typical MVC prediction structure (including both inter-picture prediction within each view and inter-view prediction) for multi-view video coding is shown in FIG. 3. Prediction directions are indicated by arrows, the pointed-to object using the pointed-from object as the prediction reference. In MVC, inter-view prediction is supported by disparity motion compensation, which uses the syntax of the H.264/AVC motion compensation, but allows a picture in a different view to be used as a reference picture.

In the example of FIG. 3, eight views (having view IDs "S0" through "S7") are illustrated, and twelve temporal locations ("T0" through "T11") are illustrated for each view. That is, each row in FIG. 3 corresponds to a view, while each column indicates a temporal location.

Although MVC has a so-called base view, which is decodable by H.264/AVC decoders, and stereo view pairs could be supported also by MVC, the advantage of MVC is that it could support an example that uses more than two views as a 3D video input and decodes this 3D video represented by the multiple views. A renderer of a client having an MVC decoder may expect 3D video content with multiple views.

Pictures in FIG. 3 are indicated at the intersection of each row and each column. The H.264/AVC standard may use the term frame to represent a portion of the video. This disclosure may use the term picture and frame interchangeably.

The pictures in FIG. 3 are illustrated using a block including a letter, the letter designating whether the corresponding picture is intra-coded (that is, an I-picture), or inter-coded in one direction (that is, as a P-picture) or in multiple directions (that is, as a B-picture). In general, predictions are indicated by arrows, where the pointed-to pictures use the pointed-from picture for prediction reference. For example, the P-picture of view S2 at temporal location T0 is predicted from the I-picture of view S0 at temporal location T0.

As with single view video encoding, pictures of a multiview video coding video sequence may be predictively encoded with respect to pictures at different temporal locations. For example, the b-picture of view S0 at temporal location T1 has an arrow pointed to it from the I-picture of view S0 at temporal location T0, indicating that the b-picture is predicted from the I-picture. Additionally, however, in the context of multiview video encoding, pictures may be inter-view predicted. That is, a view component can use the view components in other views for reference. In MVC, for example, inter-view prediction is realized as if the view component in another view is an inter-prediction reference. The potential inter-view references are signaled in the Sequence Parameter Set (SPS) MVC extension and can be modified by the reference picture list construction process, which enables flexible ordering of the inter-prediction or inter-view prediction references. Inter-view prediction is also a feature of a proposed multiview extension of HEVC, including 3D-HEVC (multiview plus depth).

FIG. 3 provides various examples of inter-view prediction. Pictures of view S1, in the example of FIG. 3, are illustrated as being predicted from pictures at different temporal locations of view S1, as well as inter-view predicted from pictures of views S0 and S2 at the same temporal locations. For example, the b-picture of view S1 at temporal location T1 is predicted from each of the B-pictures of view S1 at temporal locations T0 and T2, as well as the b-pictures of views S0 and S2 at temporal location T1.

In some examples, FIG. 3 may be viewed as illustrating the texture view components. For example, the I-, P-, B-, and b-pictures illustrated in FIG. 2 may be considered as texture view components for each of the views. In accordance with the techniques described in this disclosure, for each of the texture view components illustrated in FIG. 3 there is a corresponding depth view component. In some examples, the depth view components may be predicted in a manner similar to that illustrated in FIG. 3 for the corresponding texture view components.

Coding of two views could also be supported in MVC. One of the advantages of MVC is that an MVC encoder could take more than two views as a 3D video input and an MVC decoder can decode such a multiview representation. As such, any renderer with an MVC decoder may expect 3D video contents with more than two views.

In MVC, inter-view prediction is allowed among pictures in the same access unit (i.e., with the same time instance). When coding a picture in one of the non-base views, a picture may be added into a reference picture list if it is in a different view, but within the same time instance. An inter-view reference picture can be put in any position of a reference picture list, just like any inter prediction reference picture. As shown in FIG. 3, a view component can use the view components in other views for reference. In MVC, inter-view prediction is realized as if the view component in another view was an inter-prediction reference.

In the context of multiview video coding, in general, there are two kinds of motion vectors. One is referred to as a normal motion vector. The normal motion vector points to temporal reference pictures and the corresponding temporal inter prediction is motion-compensated prediction (MCP). The other motion vector is a disparity motion vector (DMV). The DMV points to pictures in a different view (i.e., interview reference pictures) and the corresponding inter prediction is disparity-compensated prediction (DCP).

Figure 4:
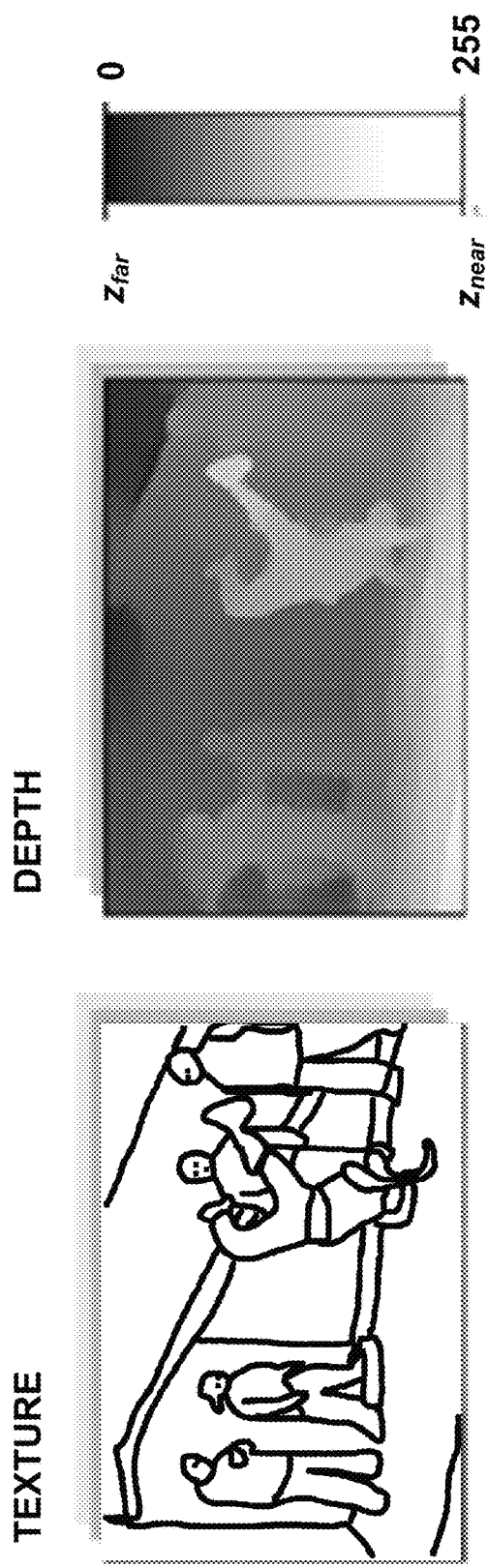
FIG. 4 is a conceptual diagram illustrating texture and depth values for 3D video.

Another type of multiview video coding format introduces the use of depth values (e.g., as in 3D-HEVC). For the multiview-video-plus-depth (MVD) data format, which is popular for 3D television and free viewpoint videos, texture images and depth maps can be coded with multiview texture pictures independently. FIG. 4 illustrates the MVD data format with a texture image and its associated per-sample depth map. The depth range may be restricted to be in the range of minimum $z_{near}$ and maximum $z_{far}$ distance from the camera for the corresponding 3D points.

Camera parameters and depth range values may be helpful for processing decoded view components prior to rendering on a 3D display. Therefore, a special supplemental enhancement information (SEI) message is defined for the current version of H.264/MVC, i.e., multiview acquisition information SEI, which includes information that specifies various parameters of the acquisition environment. However, there are no syntaxes specified in H.264/MVC for indicating the depth range related information.

Asymmetric motion partitioning (AMP) and motion compensation block sizes in HEVC will now be discussed. In HEVC, the inter-coded coding blocks may be split into one, two, or four partitions. Various shapes of such partitions are possible. Example partitioning possibilities for inter-predicted coding blocks are depicted in FIG. 5.

Figure 5:
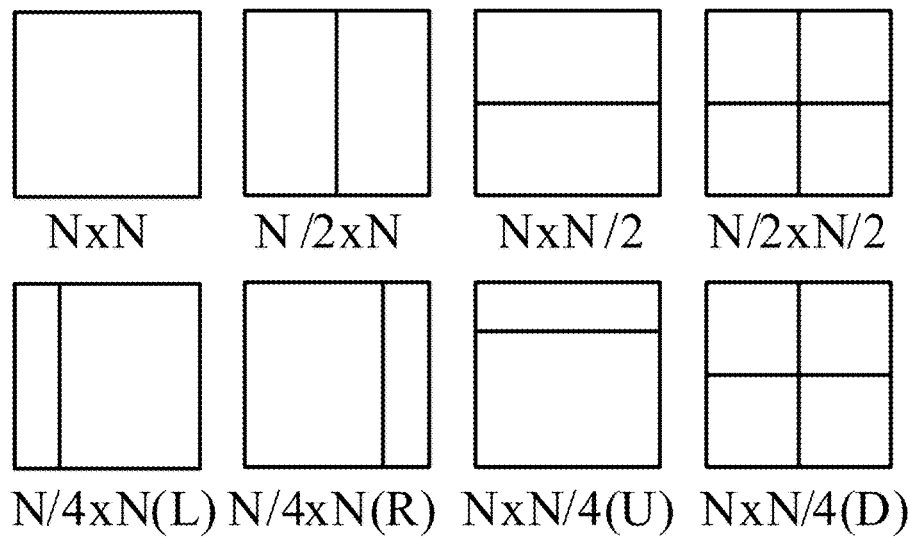
FIG. 5 is a conceptual diagram illustrating example partitioning types.

The upper row of partitions in FIG. 5 illustrates so-called symmetric partitions. An N×N partition is simply a coding block that has not been split. An N/2×N partition is a coding block split into two vertical rectangular partitions. Likewise, an N×N/2 partition is a coding block split into two horizontal rectangular partitions. An N/2×N/2 partition is a coding block split into four equal square partitions.

The lower four partition types in FIG. 5 are referred to as asymmetric partitions and may be used in asymmetric motion partitioning (AMP) for inter prediction. One partition of the AMP mode has the height or width N/4 and width or height N, respectively, and the other partition consists of the rest of the CB by having a height or width of 3N/4 and width or height N. Each inter-coded partition is assigned one or two motion vectors and reference picture indices (i.e., one motion vector and reference index for uni-directional prediction and two motion vectors and reference indices for bi-directional prediction). In some examples, to minimize the worst-case memory bandwidth, partitions of size 4×4 are not allowed for inter prediction and partitions of sizes 4×8 and 8×4 are restricted to uni-predictive coding that is based on one list of predictive data.

As will be discussed in more detail below, this disclosure describes techniques for AMP when used in conjunction with 3D-HEVC coding techniques, including backward view synthesis prediction (BVSP).

The following describes merge candidate list in HEVC. For example, the merge candidate list may be constructed with the following steps. For spatial merging candidates, video encoder 20 and/or video decoder 30 may derive up to four spatial motion vector candidates from five spatial neighboring blocks, as is illustrated in FIG. 6.

Figures 6, 7:
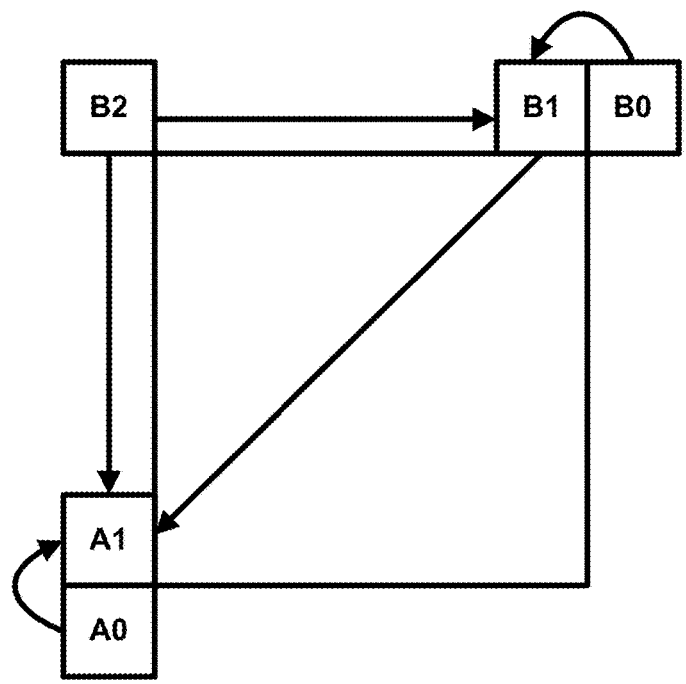
FIG. 6 is a conceptual diagram illustrating merge mode motion vector candidates.
FIG. 7 is a table indicating an example specification of merge candidate indices.

The order in which video encoder 20 and video decoder 30 may evaluate the spatial neighboring blocks is as follows: left (A1), above (B1), above right (B0), below left (A0), and above left (B2), as shown in FIG. 6. In some examples, a pruning process may be applied to remove motion vector candidates having identical motion information (e.g., motion vectors and reference indices). For example, the motion vectors and reference indices of B1 may be compared to the motion vectors and reference indices of A1, the motion vectors and reference indices of B0 may be compared to the motion vectors and reference indices of B1, the motion vectors and reference indices of A0 may be compared to the motion vectors and reference indices of A1, and the motion vectors and reference indices of B2 may be compared to the motion vectors and reference indices of both B1 and A1. One of two candidates having identical motion information may then be removed from the motion vector candidate list. If there are already four candidates available after the pruning process, candidate B2 is not inserted to the merge candidate list.

A co-located temporal motion vector predictor (TMVP) candidate from a reference picture, if enabled and available, is added into the motion vector candidate list after spatial motion vector candidates.

If a motion vector candidate list is not complete (e.g., has less than a predetermined number of entries, one or more artificial motion vector candidates may be generated and inserted at the end of the merge candidate list. Example types of artificial motion vector candidates include combined bi-predictive merging candidates derived only for B-slices, and zero motion vector merging candidates if there are not enough bi-predictive merging candidates (or other type of artificial motion vector candidates) to provide for the predetermined number of motion vector candidates.

When a current slice is a B slice, the derivation process of combined bi-predictive merging candidates is invoked. For each pair of candidates that are already in the candidate list and have necessary motion information, combined bi-predictive motion vector candidates (with an index denoted by combIdx) are derived using a combination of the motion vector of the first candidate (with merge candidate index equal to l0CandIdx) referring to a picture in the list 0 (if available), and the motion vector of a second candidate (with merge candidate index equal to l1 CandIdx) referring to a picture in the list 1 (if available and either reference picture or motion vector is different from the first candidate).

FIG. 7 is a table indicating an example specification of l0CandIdx and l1CandIdx in 3D-HEVC. For example, FIG. 7 illustrates the definitions of l0CandIdx and l1CandIdx corresponding to combIdx.

For combIdx being 0 . . . 11, the generation process of combined bi-predictive motion vector candidates is terminated when one the following conditions is true: (1) combIdx is equal to (numOrigMergeCand*(numOrigMergeCand−1)) wherein numOrigMergeCand denotes the number of candidates in the merge list before invoking this process; (2) Number of total candidates (including newly generated combined bi-predictive merging candidates) in the merge list is equal to MaxNumMergeCand.

This section describes the derivation of zero motion vector merging candidates. For each candidate, zero motion vectors and a reference picture index is set from 0 to number of available reference picture index minus 1. If there are still fewer candidates than the maximum number of merge motion vector candidates (e.g., as indicated by the MaxNumMergeCand syntax element), a zero reference index and motion vector is inserted until the total number of candidates is equal to MaxNumMergeCand.

The following describes constraint of motion compensation size in HEVC. To minimize the worst-case memory bandwidth, partitions of size 4×4 are not allowed for inter prediction and partitions of sizes 4×8 and 8×4 are restricted to uni-predictive coding.

To satisfy such a constraint mentioned above, when the current PU size is equal to 8×4 or 4×8, the generated spatial/temporal/combined bi-predictive merging candidate, if it is associated with bi-prediction mode, the current PU should be reset to use uni-prediction by modifying the prediction direction to list 0, and the reference picture index and motion vector corresponding to RefPicList1 to −1 and (0, 0), respectively.

As mentioned above, a 3D-HEVC is under development. 3D-HEVC may improve coding efficiency using inter-view motion prediction and inter-view residual prediction. In other words, to further improve the coding efficiency, two new technologies namely "inter-view motion prediction" and "inter-view residual prediction" have been adopted in reference software. In inter-view motion prediction, a video coder (e.g., video encoder 20 or video decoder 30) may determine (i.e., predict) the motion information of a current PU based on the motion information of a PU in a different view than the current PU. In inter-view residual prediction, a video coder may determine residual blocks of a current CU based on residual data in a different view than the current CU.

Neighboring block based disparity vector (NBDV) derivation in 3D-HEVC will now be discussed. NBDV derivation is used as a disparity vector derivation technique in 3D-HEVC due to the fact that 3D-HEVC uses the texture-first coding order for all the views. Since the corresponding depth map is not available for a currently coded texture picture, in NBDV, a disparity vector is derived from neighboring blocks. In the some proposals for the 3D-HEVC design, the disparity vector derived from the NBDV derivation process could be further refined by retrieving the depth data corresponding to a reference texture view.

3D-HEVC initially adopted the NBDV derivation techniques proposed in JCT3V-A0097 (3D-CE5.h: Disparity vector generation results, L. Zhang, Y. Chen, M. Karczewicz (Qualcomm)). Implicit disparity vectors were included with a simplified NBDV in JCTVC-A0126 (3D-CE5.h: Simplification of disparity vector derivation for HEVC-based 3D video coding, J. Sung, M. Koo, S. Yea (LG)). In addition, in JCT3V-B0047 (3D-CE5.h related: Improvements for disparity vector derivation, J. Kang, Y. Chen, L. Zhang, M. Karczewicz (Qualcomm)), the NBDV derivation techniques were further simplified by removing the implicit disparity vectors stored in the decoded picture buffer, but also improved a coding gain with the random access picture (RAP) selection. Additional techniques for NBDV derivation were described in JCT3V-D0181 (CE2: CU-based Disparity Vector Derivation in 3D-HEVC, J. Kang, Y. Chen, L. Zhang, M. Karczewicz (Qualcomm)).

A disparity vector (DV) is used as an estimator of the displacement between two views. Because neighbouring blocks share almost the same motion/disparity information in video coding, the current block can use the motion vector information in neighbouring blocks as a good predictor. Following this idea, the NBDV derivation process uses the neighbouring disparity information for estimating the disparity vector in different views.

To implement NBDV, video encoder 20 initially defines several spatial and temporal neighbouring blocks. Video encoder 20 then checks each of neighbouring blocks in a pre-defined order determined by the priority of the correlation between the current block and the candidate block. Once a disparity motion vector (i.e., the motion vector points to an inter-view reference picture) is found in the candidates, video encoder 20 converts the disparity motion vector to a disparity vector and the associated view order index is also returned. Two sets of neighbouring blocks are utilized. One set includes spatial neighbouring blocks and the other set includes temporal neighbouring blocks.

Figure 8:
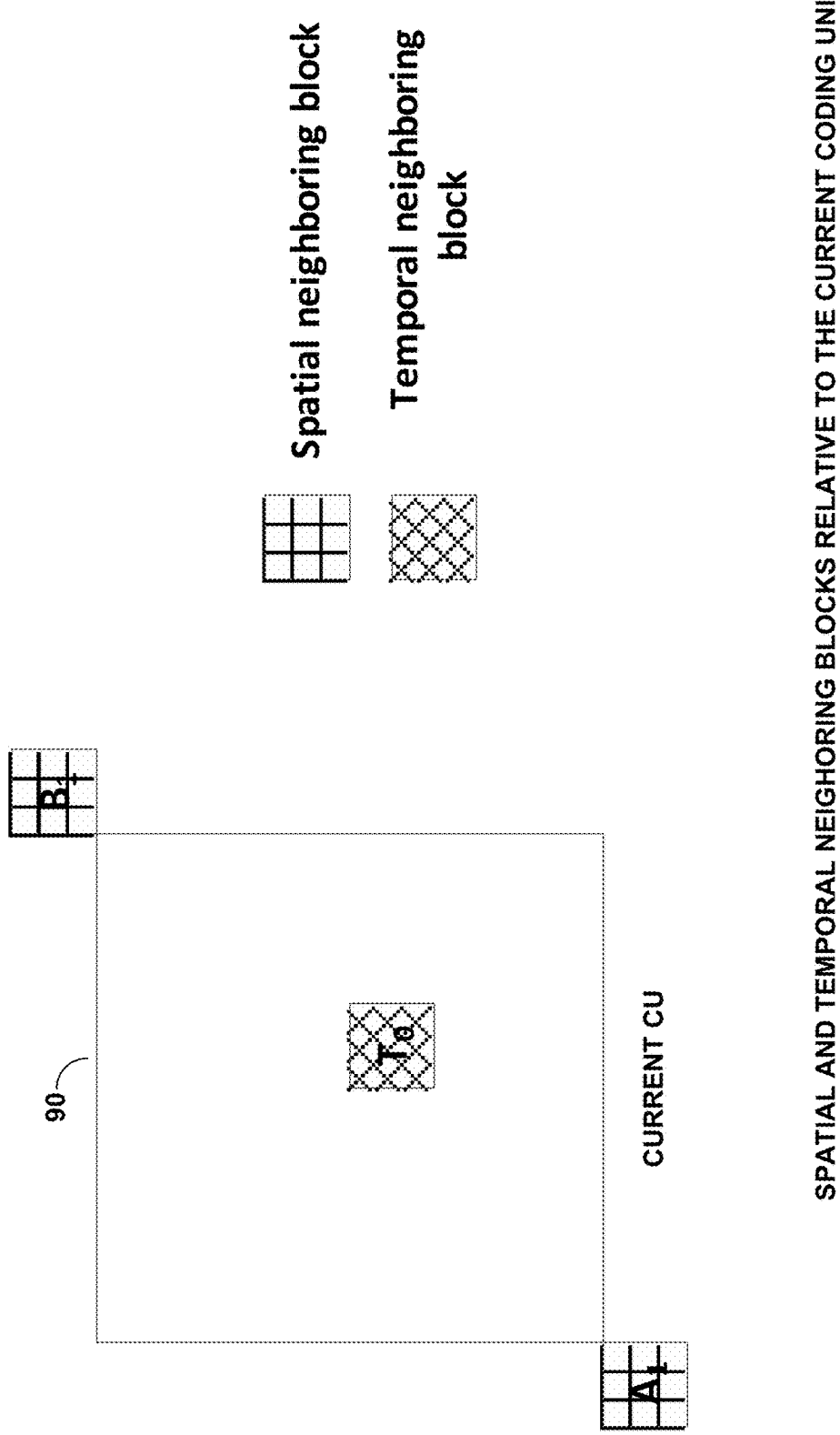
FIG. 8 is a conceptual diagram illustrating neighboring blocks used for an example disparity vector derivation process.

In recent proposals for 3D-HEVC, two spatial neighbouring blocks are used in NBDV derivation. The spatial neighbouring blocks are the left and above neighbouring blocks relative to current coding unit (CU) 90, as denoted by A1 and B1, respectively, in FIG. 8. It should be noted that the neighbouring blocks depicted in FIG. 8 are in the same location as some of the neighbouring blocks used in the MERGE mode in HEVC. Therefore, no additional memory access is required. However, it should be understood that neighbouring blocks in other locations relative to current CU 90 may also be used.

For checking temporal neighbouring blocks, video encoder 20 first performs a construction process for a candidate picture list. Up to two reference pictures from a current view may be treated as candidate pictures. Video encoder 20 first adds a co-located reference picture to the candidate picture list, followed by the rest of candidate pictures in the ascending order of reference index. When the reference pictures with the same reference index in both reference picture lists are available, the reference picture in the same reference picture list as the co-located picture precedes the other reference picture having the same reference index. For each candidate picture in the candidate picture list, video encoder 20 determines the block of the co-located region covering the centre position as the temporal neighbouring block.

When a block is coded with inter-view motion prediction, a disparity vector may be derived for selecting a corresponding block in a different view. The disparity vector derived in the inter-view motion prediction process is referred to as an implicit disparity vector (IDV or a.k.a. derived disparity vector. Even though the block is coded with motion prediction, the derived disparity vector is not discarded for the purpose of coding a following block.

In one design of the HTM, during the NBDV derivation process, a video coder (e.g., video encoder 20 and/or video decoder 30) is configured to check disparity motion vectors in the temporal neighboring blocks, disparity motion vectors in the spatial neighboring blocks, and then the IDVs, in order. Once, the disparity motion vector or IDV is found, the process is terminated.

Refinement of the NBDV derivation process (NBDV-R) by accessing depth information will now be discussed. When a disparity vector is derived from the NBDV derivation process, the derived disparity vector may be further refined by retrieving the depth data from the reference view's depth map. The refinement process may include the following techniques:
  a) Locate a corresponding depth block by the derived disparity vector in the previously coded reference depth view, such as the base view; the size of the corresponding depth block is the same as that of current PU.
  b) Select one depth value from four corner pixels of the corresponding depth block and convert the depth value to the horizontal component of the refined disparity vector. The vertical component of the disparity vector is unchanged.

Note, in some examples, the refined disparity vector may be used for inter-view motion prediction while the unrefined disparity vector may be used for inter-view residual prediction. In addition, the refined disparity vector may be stored as the motion vector of one PU if the PU is coded with backward view synthesis prediction mode. In some proposals for 3D-HEVC, the depth view component of base view may be accessed regardless of the value of view order index derived from the NBDV derivation process.

Backward view synthesis prediction (BVSP) techniques in 3D-HEVC will now be discussed. One example BVSP approach, as proposed by D. Tian, et al. "CE1.h: Backward View Synthesis Prediction Using Neighboring Blocks," JCT3V-00152, available from http://phenix.it-sudparis.eu/jct2/doc_end_user/current_document.php?id=594, was adopted in the 3rd JCT-3V meeting. The basic idea of BVSP is similar to the block-based view synthesis prediction in 3D-AVC. Both of these two techniques use backward-warping and block-based view synthesis prediction to avoid transmitting the motion vector differences and use more precise motion vectors. The implementation details of BVSP in 3D-HEVC and 3D-AVC are different due to the different platforms.

In 3D-HEVC, the BVSP mode is supported for an inter-coded block that is coded in either skip or merge mode. In one example proposal for 3D-HEVC, BVSP mode is not allowed for a block coded in advanced motion vector prediction (AMVP) mode. Instead of transmitting a flag to indicate the usage of BVSP mode, video encoder 20 may be configured to add one additional merging candidate (i.e., BVSP merging candidate) to the merge candidate list, and each candidate is associated with one BVSP flag. When the decoded merge index corresponds to a BVSP merging candidate, the decoded merge index indicates that the current prediction unit (PU) uses the BVSP mode. For each sub-block within the current PU, a disparity motion vector may be derived by converting a depth value in a depth reference view.

The setting of BVSP flags is defined as follows. When a spatial neighboring block used for deriving a spatial merging candidate is coded with BVSP mode, the associated motion information of the spatial merging candidate is inherited by the current block, as in conventional merging mode. In addition, this spatial merging candidate is associated with a BVSP flag equal to 1 (i.e., indicating that the spatial merging candidate was coded with BVSP mode). For the newly introduced BVSP merging candidate, the BVSP flag is set to 1. For all the other merging candidates, the associated BVSP flags are set to 0.

As discussed above, in 3D-HEVC, video encoder 20 may be configured to derive and insert a new candidate, named the BVSP merging candidate, into the merge candidate list. The corresponding reference picture indices and motion vectors are set by the following method.

First video encoder 20 may be configured to obtain the view index denoted by view index syntax element (e.g., refVIdxLX in 3D-HEVC) of the derived disparity vector from the NBDV derivation process. Video encoder 20 may also be configured to obtain the reference picture list (e.g., RefPicListX (either RefPicList0 or RefPicList1)) that is associated with the reference picture with the view order index equal to refVIdxLX. Video encoder 20 then uses the corresponding reference picture index and the disparity vector obtained from the NBDV derivation process as the motion information of the BVSP merging candidate in RefPicListX (i.e., either RefPicList0 or RefPicList1).

If current slice is a B slice, video encoder 20 checks the availability of an interview reference picture with view order index denoted by refVIdxLY unequal to refVIdxLX in the reference picture list other than RefPicListX, i.e., RefPicListY with Y being 1−X. If such a different interview reference picture is found, video encoder 20 performs bi-predictive view synthesis prediction. Video encoder 20 may be further configured to use the corresponding reference picture index of the different interview reference picture and the scaled disparity vector from NBDV derivation process as the motion information of the BVSP merging candidate in RefPicListY. The depth block from the view having a view order index equal to refVIdxLX is used as the current block's depth information (in case of texture-first coding order). Video encoder 20 synthesizes the two different interview reference pictures (one from each reference picture list) via a backward warping process and further weights the synthesized reference pictures to achieve the final BVSP predictor.

For slice types other than a B slice (e.g., a P slice), video encoder 20 applies uni-predictive view synthesis prediction with RefPicListX as the reference picture list for prediction.

In 3D-HTM, texture first coding is applied in common test conditions. Since the texture component of a view is coded before the depth component, the corresponding non-base depth component is unavailable when decoding one non-base texture component. Therefore, video decoder 30 may be configured to estimate depth information, and then use the estimated depth information to perform BVSP. In order to estimate the depth information for a block, it is proposed to first derive a disparity vector from neighboring blocks (e.g., using the NBDV derivation process), and then use the derived disparity vector to obtain a depth block from a reference view.

Figure 9:
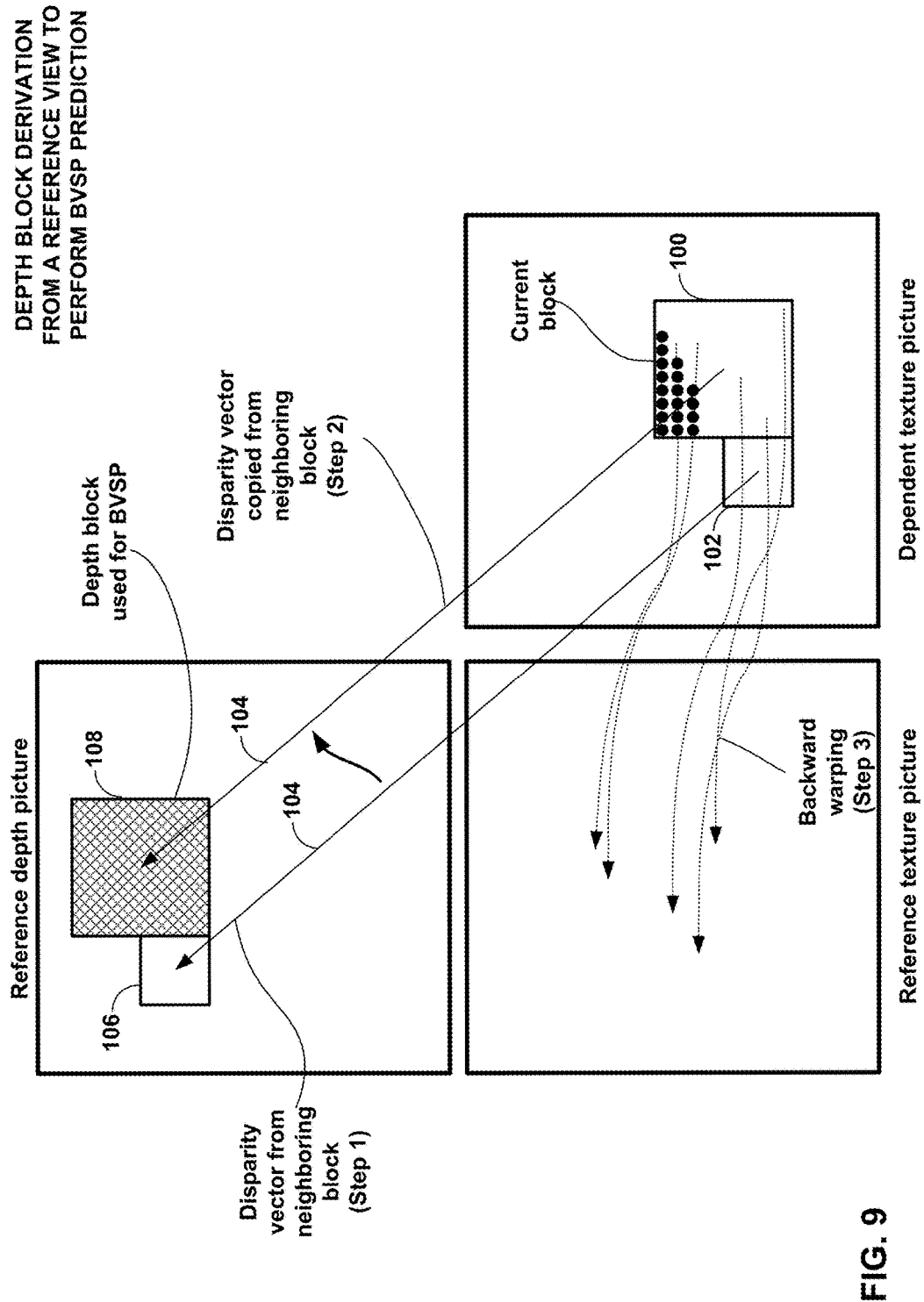
FIG. 9 is a conceptual diagram illustrating a neighboring block disparity vector derivation process.

FIG. 9 illustrates example techniques for locating a depth block from the reference view, and then using the depth block for BVSP prediction. Initially, video encoder 20 and/or video decoder 30 may utilize a disparity vector 104 associated with neighboring bock 102. That is, video encoder 20 and/or video decoder 30 may access disparity vector information from already encoded neighboring blocks (such as neighboring block 102) and reuse any associated disparity vector information for current block 100. Disparity vector 104 points to depth block 106 in a reference depth picture. When disparity vector 104 is reused for current block 100, disparity vector 104 now points to depth block 108 in the reference depth picture. Depth block 108 corresponds to current block 100. Video encoder 20 and/or video decoder 30 may then use the depth information in reference depth picture 108 to synthesize a block in a reference texture picture using backward warping techniques. The synthesized texture picture may then be used as a reference picture to predict current block 100.

Figure 10:
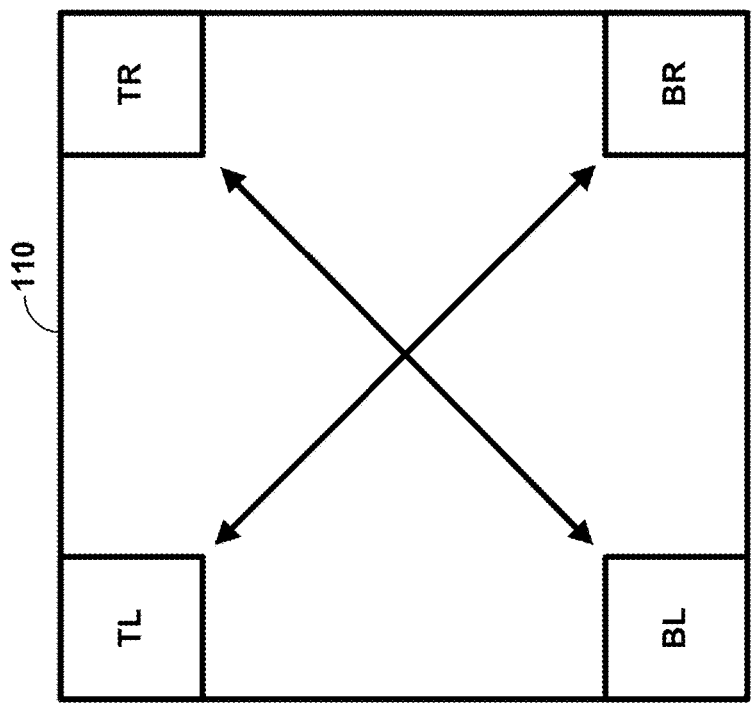
FIG. 10 is a conceptual diagram illustrating four corner pixels of an 8×8 depth block.

In one example of this disclosure, for the NBDV derivation process, let ($dv_x$, $dv_y$) denote the disparity vector 104 identified by the NBDV derivation process, and denote the position of current block 100 as ($block_x$, $block_y$). In one example of uni-predictive BVSP, video encoder 20 and/or video decoder 30 may be configured to fetch a depth block 108 having a top-left position of ($block_x+dv_x$, $block_y+dv_y$) in the depth view component of the reference view. Video encoder 20 and/or video decoder 30 may be configured to first split current block 100 (e.g., a PU) into several sub-blocks, each with the same size (e.g., equal to W*H). For each sub-block with the size equal to W*H, video encoder 20 and/or video decoder 30 identifies the maximum depth value from the four corner pixels of the corresponding depth sub-block 108 within the fetched depth view component, for example, as shown in FIG. 10. FIG. 10 is a conceptual diagram illustrating four corner pixels of an 8×8 depth block 110. The four corner pixels may be labeled as a top-left (TL) pixel, a top-right (TR) pixel, a bottom-left (BL) pixel, and a bottom-right (BR) pixel. Video encoder 20 and/or video decoder 30 converts the maximum depth value into a disparity motion vector. The derived disparity motion vector for each sub-block is then used for motion compensation.

This section will discuss BVSP when performing bi-directional prediction. When there are multiple interview reference pictures from different views in RefPicList0 and RefPicList1, video encoder 20 and/or video decoder 30 applies bi-predictive BVSP. In bi-prediction BVSP, two view synthesis prediction predictors (i.e., two synthesized reference blocks) will be generated from each reference list, as described above. The two view synthesis prediction predictors are then averaged to obtain the final view synthesis prediction predictor.

The motion compensation size, i.e., W*H as described above, could be either 8×4 or 4×8. In one example, to determine the motion compensation size, the following rule is applied:

For each 8×8 block, four corners of corresponding depth 8×8 block are checked and:
if (vdepth[TL]<vdepth[BR]?0:1)!=(vdepth[TR]<vdepth[BL]?0:1)
  use 4×8 partition (W=4, H=8)
else
  use 8×4 partition (W=8, H=4)

The following describes inter-view candidate derivation process for skip/merge mode in one proposal for 3D-HEVC. Based on the disparity vector derived from the NBDV derivation process, a new motion vector candidate, called an Inter-view Predicted Motion Vector Candidate (IPMVC), if available, may be added to AMVP and skip/merge mode motion vector candidate list. The inter-view predicted motion vector, if available, is a temporal motion vector. Since skip modes has the same motion vector derivation process as merge mode, all techniques described in this document apply to both merge and skip modes.

Figure 11:
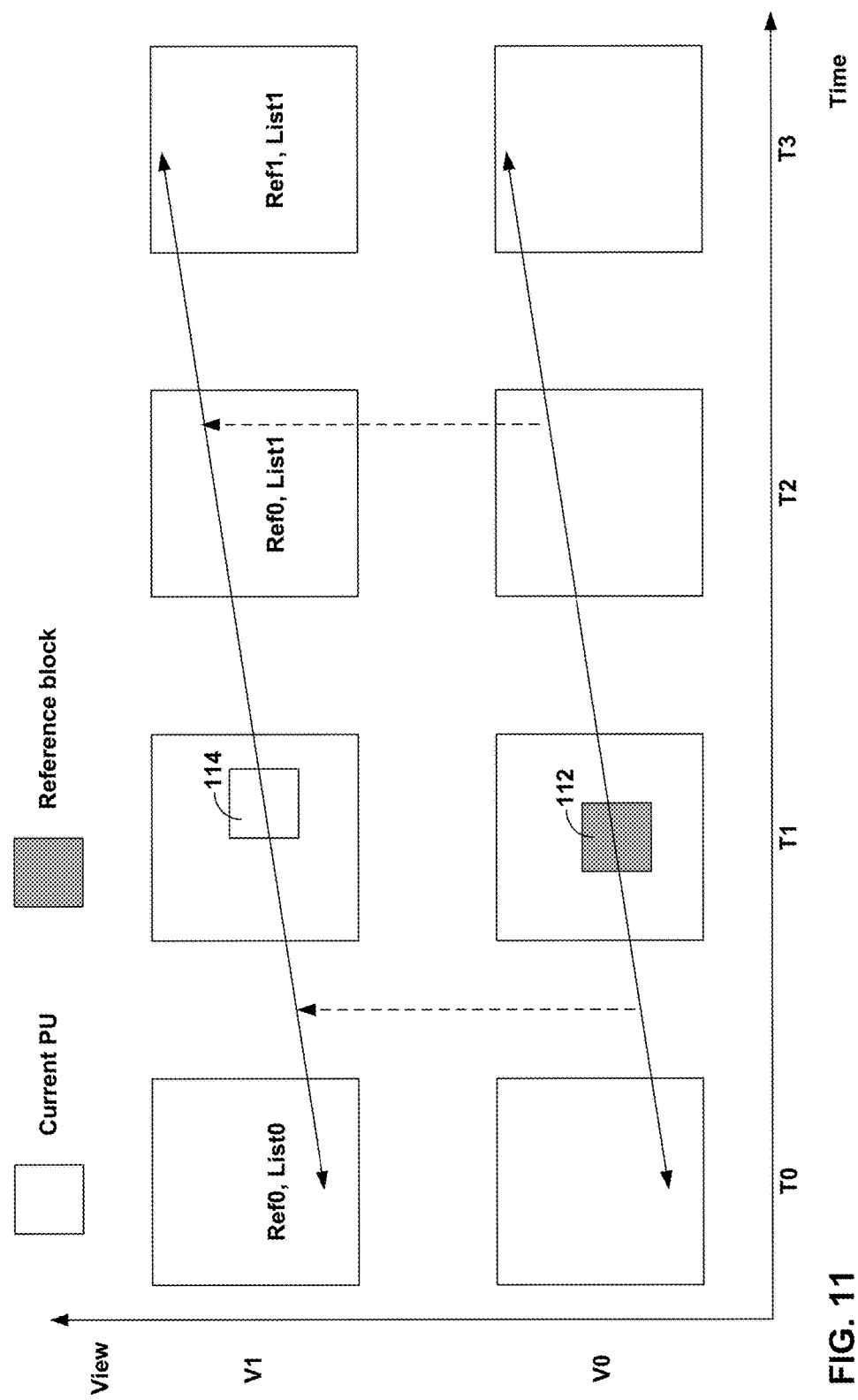
FIG. 11 is a conceptual diagram illustrating an example derivation of inter-view predicted motion vector candidate for merge/skip mode.

FIG. 11 is a conceptual diagram illustrating an example derivation of inter-view predicted motion vector candidate for merge/skip mode. For example, FIG. 11 shows an example of the derivation process of the inter-view predicted motion vector candidate. For the merge/skip mode, the inter-view predicted motion vector candidate is derived by the following steps. First, video encoder 20 and/or video decoder 30 locates, using the disparity vector, a corresponding block (e.g., a reference block) 112 of current PU/CU 114 in a reference view of the same access unit. In the example of FIG. 11, the current block (current PU) 114 is in view V1, while the corresponding reference block 112 is in view V0. If the corresponding reference block 112 is not intra-coded and not inter-view predicted, and its reference picture (in this example in view V0 and time T1) has a POC value equal to that of one entry in the same reference picture list of current PU/CU 114, the motion information (i.e., prediction direction, reference picture index, and motion vector) of the corresponding reference block 112 is derived to be the inter-view predicted motion vector after converting the reference index based on the POC of the reference picture.

Corresponding reference block 112 may be defined may be defined as follows. First denote a luma location (xP, yP) of the top-left luma sample of the current prediction unit relative to the top-left luma sample of the current picture. The variables nPSW and nPSH denote the width and height of the current prediction unit, respectively. The reference view order index is labeled as refViewIdx, and the disparity vector as mvDisp. The reference layer luma location (xRef, yRef) is derived by:

$$xRef = Clip3(0, PicWidthInSamples_L - 1, xP + ((nPSW-1)>>1) + ((mvDisp[0]+2)>>2)) \quad \text{(H-124)}$$

$$yRef = Clip3(0, PicHeightInSamples_L - 1, yP + ((nPSH-1)>>1) + ((mvDisp[1]+2)>>2)) \quad \text{(H-125)}$$

Corresponding reference block 112 is set to the prediction unit that covers the luma location (xRef, yRef) in the view component with ViewIdx equal to refViewIdx. In addition, the disparity vector may converted to an inter-view disparity motion vector (IDMVC), which is added into merge candidate list in a different position from the IPMVC. The inter-view disparity motion vector may also be added into the AMVP candidate list in the same position as IPMVC, when it is available. Either the IPMVC or the IDMVC may be referred to as an 'inter-view candidate' in this context.

In one example for merge/skip mode, the IPMVC, if available, is inserted before all spatial and temporal merging candidates to the merge candidate list. The IDMVC is inserted before the spatial merging candidate derived from $A_0$.

The following section describes merge candidate list constructions for texture coding in 3D-HEVC. First, video encoder 20 and/or video decoder 30 derive a disparity vector, for example, using the NBDV derivation techniques described above. After deriving the disparity vector, video encoder 20 and/or video decoder 30 may be configured to execute the merge candidate list construction process in 3D-HEVC as described below.

Video encoder 20 and/or video decoder 30 may derive one or more IPMVCs using the procedure described above. If an IPMVC is available, the IPMV may be inserted to the merge list.

Next, video encoder 20 and/or video decoder 30 may configured to derive spatial merge candidates and one or more IDMVCs insertion in 3D-HEVC. To derive spatial merge candidates, video encoder 20 and/or video decoder 30 may be configured to check the motion information of spatial neighboring PUs in the following order: $A_1$, $B_1$, $B_0$, $A_0$, or $B_2$, for example, as shown in FIG. 6.

Video encoder 20 and/or video decoder 30 may be further configured to perform constrained pruning. To perform constrained pruning, video encoder 20 and/or video decoder 30 may be configured to not insert the spatial merge candidate at location $A_1$ into the merge candidate list if $A_1$ and IPMVC have the same motion vectors and the same reference indices. Otherwise the spatial merge candidate at location $A_1$ is inserted into the merge candidate list.

If the merge candidate at location $B_1$ and the merge candidate at merge location $A_1$ (or the IPMVC) have the same motion vectors and the same reference indices, the merge candidate at location $B_1$ is not inserted into the merge candidate list. Otherwise the merge candidate at location $B_1$ is inserted into the merge candidate list. If merge candidate at location $B_0$ is available (i.e., is coded and has motion information), the merge candidate at location $B_0$ is added to the candidate list. Video encoder 20 and/or video decoder 30 derives the IDMVC using the procedure described above. If an IDMVC is available, and the motion information of the IDMVC is different from the candidates derived from $A_1$ and $B_1$, the IDMVC is inserted to the candidate list.

If BVSP is enabled for the whole picture (or for the current slice), then the BVSP merging candidate is inserted to the merge candidate list. If the merge candidate at location $A_0$ is available, it is added to the candidate list. If the merging candidate at $B_2$ is available, it is added to the candidate list.

The next section will discuss the derivation process for the temporal merging candidate in 3D-HEVC. Temporal merging candidate derivation in 3D-HEVC is similar to the temporal merging candidate derivation process in HEVC, where the motion information of the co-located PU is utilized. However, for 3D-HEVC, the target reference picture index of the temporal merging candidate may be changed instead of fixing the reference picture index to be 0. When a target reference index equal to 0 corresponds to a temporal reference picture (in the same view), while the motion vector of the co-located prediction unit (PU) points to an inter-view reference picture, the target reference index is changed to another index which corresponds to the first entry of an inter-view reference picture in the reference picture list. On the contrary, when the target reference index equal to 0 corresponds to an inter-view reference picture, while the motion vector of the co-located prediction unit (PU) points to a temporal reference picture, the target reference picture index is changed to another index which corresponds to the first entry of a temporal reference picture in the reference picture list.

An example derivation process for combined bi-predictive merging candidates in 3D-HEVC will now be discussed. If the total number of candidates derived from the above two steps (i.e., the derivation of spatial merging candidates and the derivation of temporal merging candidates) is less than the maximum number of candidates (which may be pre-defined), the same process as defined in HEVC, as described above, is performed. However, the specification of reference indices l0CandIdx and l1CandIdx is different. FIG. 12 is another table indicating an example specification of l0CandIdx and l1CandIdx in 3D-HEVC. For example, the relationship among combIdx, l0CandIdx and l1CandIdx are defined in the table illustrated in FIG. 12.

One example derivation process for zero motion vector merging candidates in 3D-HEV is the same procedure as defined in HEVC. In one example for 3D-HEVC, the total number of candidates in the merge candidate list is up to 6, and the five_minus_max_num_merge_cand syntax element is generated in the slice header to specify the maximum number of the merge candidates subtracted from 6. It should be noticed that the value of the syntax element five_minus_max_num_merge_cand is in the range of 0 to 5, inclusive.

Figure 13:
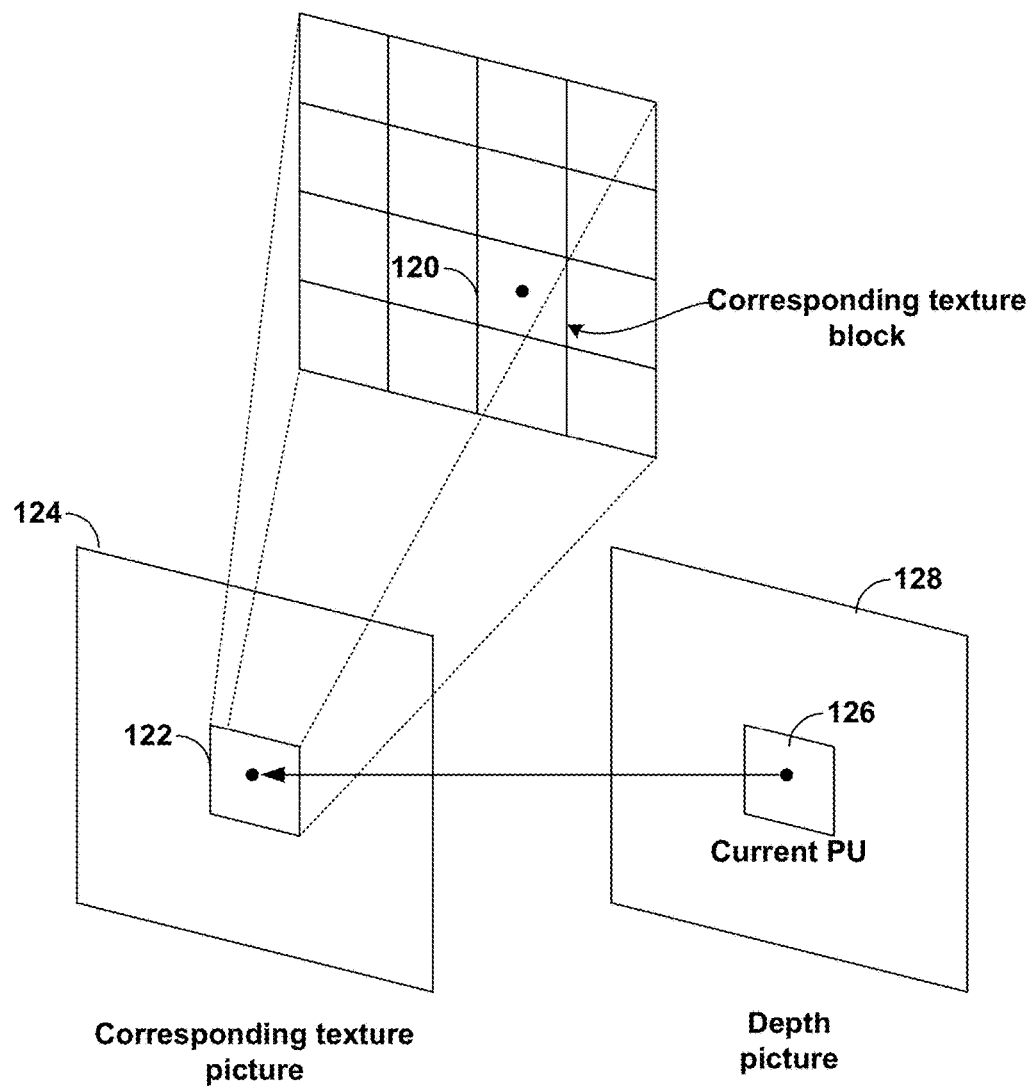
FIG. 13 is a conceptual diagram illustrating an example derivation of a motion vector inheritance candidate for depth coding.

The following describes motion vector inheritance (MVI) for depth coding, e.g., in 3D-HEVC. MVI techniques seek to exploit the similarity of the motion characteristics between texture components of a picture and their associated depth view components. FIG. 13 is a conceptual diagram illustrating an example derivation of a motion vector inheritance candidate for depth coding. For example, FIG. 13 shows an example of the derivation process of the MVI candidate where corresponding texture block 120 is selected as the 4×4 block located to the right bottom of the center of the current PU 122 in a texture picture 124. For current PU 126 in depth picture 128, the MVI candidate reuses using the motion vectors and reference indices associated with already coded corresponding texture block 120 in corresponding texture picture 124, if such information is available.

It should be noted that motion vectors with integer precision are used in depth coding, while motion vectors with quarter precision are utilized for texture coding. Therefore, the motion vector of the corresponding texture block may be scaled before using as a MVI candidate.

With the MVI candidate generation, the merge candidate list for the depth views is constructed as follows. For MVI insertion, the MVI is derived using the techniques as described above, and, if available is inserted into the merge candidate list.

The derivation process for spatial merging candidates and IDMVC insertion in 3D-HEVC for depth coding is described below. First video encoder 20 and/or video decoder 30 may be configured to check the motion information of spatial neighboring PUs in the following order: $A_1$, $B_1$, $B_0$, $A_0$, or $B_2$.

Video encoder 20 and/or video decoder 30 may then perform constrained pruning as follows. If the motion vector candidate at location $A_1$ and the MVI candidate have the same motion vectors and the same reference indices, the motion vector candidate at $A_1$ is not inserted into the merge candidate list. If the motion vector candidate at location $B_1$ and the motion vector candidate at location $A_1$/MVI candidate have the same motion vectors and the same reference indices, the motion vector candidate at location $B_1$ is not inserted into the merge candidate list. If the motion vector candidate at location $B_0$ is available, the motion vector candidate at location $B_0$ is added to the merge candidate list. If the motion vector candidate at location $A_0$ is available, the motion vector candidate at location $A_0$ is added to the merge candidate list. If the motion vector candidate at location $B_2$ is available, the motion vector candidate at location $B_2$ is added to the merge candidate list.

The derivation process for the temporal merging candidate in 3D-HEVC depth coding is ssimilar to the temporal merging candidate derivation process in HEVC, where the motion information of the co-located PU is utilized. However, in 3D-HEVC depth coding, the target reference picture index of the temporal merging candidate may be changed, as explained above, instead of be fixed to be 0.

The derivation process for combined bi-predictive merging candidates in 3D-HEVC depth coding will now be described. If the total number of candidates derived from the above two steps are less than the maximum number of candidates, the same process as defined in HEVC is performed, except for the specification of l0CandIdx and l1CandIdx. The relationship among combIdx, l0CandIdx and l1CandIdx are defined in the table illustrated in FIG. 12.

The derivation process for zero motion vector merging candidates in 3D-HEVC depth coding is the same as the procedure defined in HEVC.

The following describes example techniques for advanced residual prediction (ARP). ARP applied to CUs with partition mode equal to Part 2N×2N (e.g., N×N in FIG. 5) was adopted in the $4^{th}$ JCT3V meeting, as proposed in JCT3V-D0177. The JCT3V-D0177 document is entitled "CE4: Advanced residual prediction for multiview coding," by Zhang et al. The JCT3V-D0177 document is available, as of Aug. 22, 2014, from http://phenix.it-sudparis.eu/jct3v/doc_end_user/current_document.php?id=862.

Figure 14:
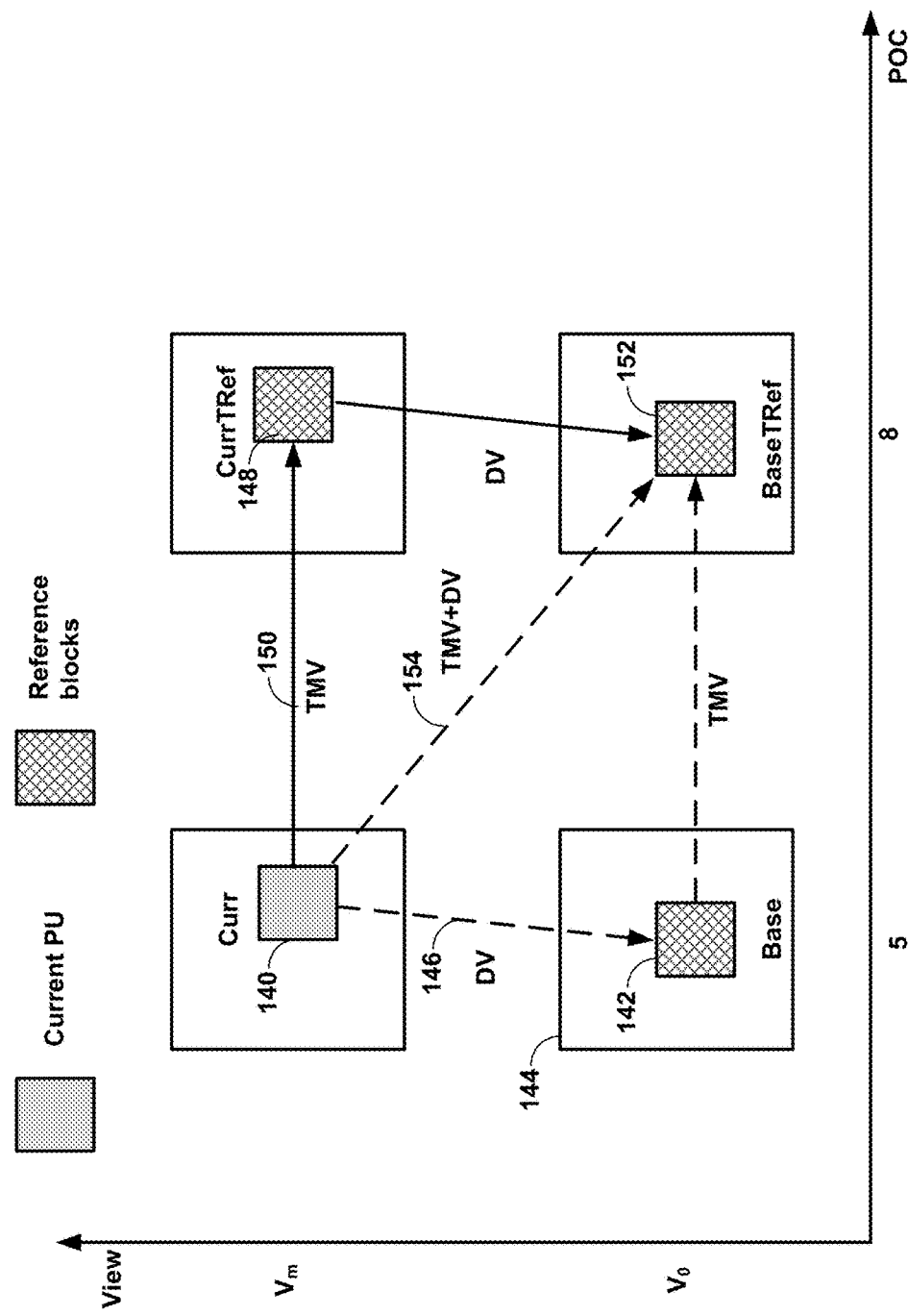
FIG. 14 illustrates the prediction structure of advanced residual prediction (ARP) in multiview video coding.

FIG. 14 illustrates the prediction structure of advanced residual prediction (ARP) in multiview video coding. As shown in FIG. 14, the following blocks are invoked in the prediction of the current block ("Curr") 140. Reference block 142 in reference/base view 144 derived by the disparity vector (DV) 146 is labeled "Base." Block 148 in the same view (view $V_m$) as current block Curr 140, derived by the (temporal) motion vector 150 (denoted as TMV) of current block 140 is labeled "CurrTRef." Block 152 in the same view as block Base 142 (view $V_0$), derived by the temporal motion vector of the current block (TMV) is labeled "BaseTRef. Reference block BaseTRef 152 is identified with a vector of TMV+DV 154 compared with the current block Curr 140.

The residual predictor is denoted as BaseTRef-Base, wherein the subtraction operation applies to each pixel of the denoted pixel arrays. A weighting factor "w" may be further multiplied to the residual predictor. Therefore the final predictor of the current block Curr may be denoted as CurrTRef+w*(BaseTRef-Base).

Note in the above descriptions and FIG. 14, it is assumed that uni-directional prediction is applied. When extending to ARP to bi-directional prediction, the above steps are applied for each reference picture list. When current block Curr uses an inter-view reference picture (in a different view) for one of the two reference picture lists, the ARP process is disabled.

The following describes the decoding process in ARP. First, video decoder 30 obtains a disparity vector (e.g., using the NBDV derivation process) pointing to a target reference view. Then, in the picture of the reference view within the same access unit, video decoder 30 locates the corresponding block using the disparity vector.

Video decoder 30 may re-use the motion information of the current block to derive the motion information for the reference block. Video decoder 30 may then apply motion compensation for the corresponding block based the same motion vector of current block, and the derived reference picture, to derive a residue block.

Figure 15:
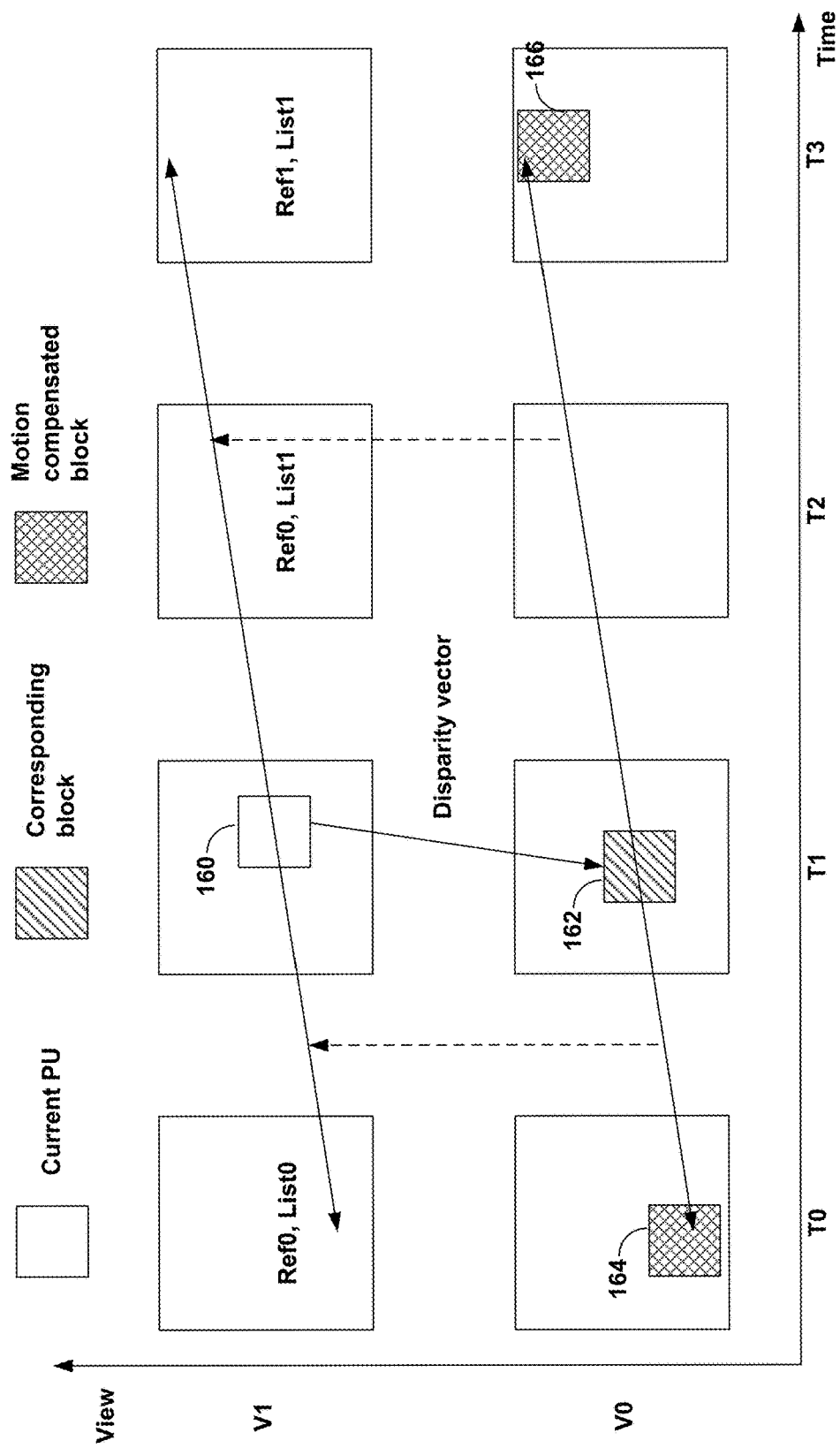
FIG. 15 is a conceptual diagram illustrating an example relationship among a current block, a reference block, and motion compensated blocks.

FIG. 15 is a conceptual diagram illustrating an example relationship among current block 160, reference block 162, and motion compensated blocks 164 and 166. The reference picture in the reference view ($V_0$) which has the same POC (Picture Order Count) value as the reference picture of current view ($V_m$) is selected as the reference picture of corresponding block 162. Video encoder 20 and/or video decoder 30 may apply a weighting factor to the residue block to get a weighted residue block and add the values of the weighted residue block to the predicted samples.

The following describes the weighting factor. Three weighting factors are used in ARP, i.e., 0, 0.5 and 1. The weighting factor leading to the most minimal rate-distortion cost for the current CU is selected as the final weighting factor and the corresponding weighting factor index (e.g., 0, 1 and 2 which correspond to weighting factor 0, 1, and 0.5, respectively) is transmitted in the bitstream at the CU level. In one example of ARP, all PU predictions in one CU share the same weighting factor. When the weighting factor is equal to 0, ARP is not used for the current CU.

The following describes some further simplifications for ARP. First, reference picture selection via motion vector scaling is described. Second, interpolation filter is described.

For reference picture selection via motion vector scaling, in JCT3V-00049, the reference pictures of prediction units coded with non-zero weighting factors may be different from block to block. The JCT3V-00049 document is entitled "3D-CE4: Advanced residual prediction for multiview coding," by Zhang et al. The JCT3V-C0049 document is available, on Sep. 23, 2013, from http://phenix.int-evry.fr/jct3v/doc_end_user/current_document.php?id=487.

Therefore, different pictures from the reference view may need to be accessed to generate the motion-compensated block (e.g., BaseTRef in FIG. 14) of the corresponding block. It has been proposed to scale the decoded motion vectors of the current PU towards a fixed picture before performing motion compensation for the residual generation process when the weighting factor is unequal to 0. As proposed in JCT3V-D0177, the fixed picture is defined as the first reference picture of each reference picture list if it is from the same view. When the decoded motion vector does not point to the fixed picture, video decoder 30 may first scaled the decoded motion vector and then use the scaled motion vector to identify CurrTRef and BaseTRef. Such a reference picture used for ARP is called target ARP reference picture.

For interpolation filters, as described in JCT3V-O0049, video encoder 20 and/or video decoder 30 may apply a bi-linear filter during the interpolation process of the corresponding block and its prediction block. For the prediction block of the current PU in the non-base views, a conventional 8/4-tap filter may be applied. In another example, as proposed in JCT3V-D0177, video encoder 20 and/or video decoder 30 may always employ bi-linear filtering regardless of whether the block is in base view or non-base view when ARP is applied.

In one or more examples of the disclosure, video encoder 20 and/or video decoder 30 may be configured to identify the reference view using the view order index returned from the NBDV derivation process. In one example of ARP, when the reference picture of one PU in one reference picture list is from a different view than the current view, ARP is disabled for this reference picture list.

Some addition techniques for depth inter coding are described in U.S. Provisional Application Nos. 61/840,400, filed Jun. 27, 2013, and 61/847,942, filed Jul. 18, 2013. In these examples, when coding a depth picture, a disparity vector is converted by an estimated depth value from the neighboring samples of the current block.

In other examples for ARP, additional merge candidates may be derived e.g., by accessing the reference block of the base view identified by a disparity vector.

The following describes techniques for locating a block for inter-view motion prediction. In 3D-HEVC, a reference 4×4 block is identified using two general steps. The first step is to identify a pixel in a reference view with a disparity motion vector. The second step is to obtain the corresponding 4×4 block (with a unique set of motion information corresponding to RefPicList0 or RefPicList1 respectively) and utilize the motion information to create a merge candidate.

The pixel (xRef, yRef) in the reference view is identified as follows:

$$x\text{Ref}=\text{Clip3}(0,\text{PicWidthInSamples}_L-1,xP+ ((nPSW-1)\!>\!>\!1)+((mv\text{Disp}[0]+2)\!>\!>\!2)) \quad (\text{H-124})$$

$$y\text{Ref}=\text{Clip3}(0,\text{PicHeightInSamples}_L-1,yP+ ((nPSH-1)\!>\!>\!1)+((mv\text{Disp}[1]+2)\!>\!>\!2)) \quad (\text{H-125})$$

wherein (xP, yP) is the coordination of the top-left sample of the current PU, mvDisp is the disparity vector and nPSW× nPSH is the size of the current PU and PicWidthInSamples$_L$ and PicHeightInSamples$_L$ define the resolution of the picture in the reference view (same as the current view).

The following describes sub-PU level inter-view motion prediction. In JCT3V-E0184, it was proposed to use a sub-PU level inter-view motion prediction method for the IPMVC, i.e., the candidate derived from a reference block in the reference view. The JCT3V-E0184, "3D-CE3.h related: Sub-PU level inter-view motion prediction," by An et al., is available, from http://phenix.it-sudparis.eu/jct2/doc_end_user/current_document.php?id=1198.

The basic concept of inter-view motion prediction is described above (e.g., with respect to inter-view candidate derivation process for skip/merge mode), wherein only the motion information of the reference block associated with the center position is used for the current PU in the dependent view. However, the current PU may correspond to a reference area (with the same size as current PU identified by the disparity vector) in the reference view, and the reference area may have plentiful motion information (i.e., more than on motion vector).

Figure 16:
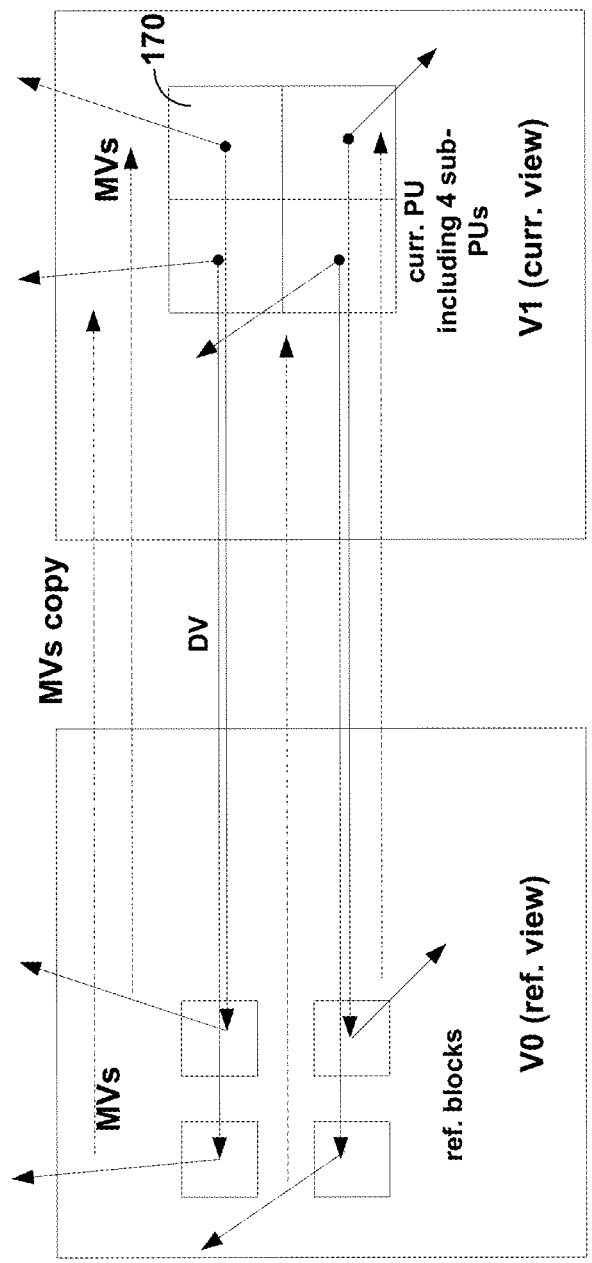
FIG. 16 is a conceptual diagram illustrating sub-prediction unit inter-view motion prediction.

Therefore, a sub-PU level inter-view motion prediction (SPIVMP) method is proposed. FIG. 16 is a conceptual diagram illustrating sub-prediction unit (PU) inter-view motion prediction. As shown in FIG. 16, current PU 170 in current view V1 may be split into multiple sub-PUs (e.g., four sub-PUs). A disparity vector for each sub-PU may be used to locate corresponding reference blocks in a reference view V0. Video encoder 20 and/or video decoder 30 may be configured to copy (i.e., reuse) motion vectors associated with each of the reference blocks for use with the corresponding sub-PUs of current PU 170.

In one example, a temporal inter-view merge candidate is derived as follows. First, denote the assigned sub-PU size by N×N. First, divide the current PU into multiple sub-PUs with a smaller size. Denote the size of current PU by nPSW×nPSH and size of sub-PU by nPSWsub×nPSHSub.

$$n\text{PSWsub}=\min(N,n\text{PSW})$$

$$n\text{PSHSub}=\min(N,n\text{PSH})$$

Second, set a default motion vector tmvLX to (0, 0) and reference index refLX to −1 for each reference picture list. For each sub-PU in the raster scan order, the following applies. Add the DV to the middle position of current sub-PU to obtain a reference sample location (xRefSub, yRefSub) by:

$$x\text{RefSub}=\text{Clip3}(0,\text{PicWidthInSamples}_L-1,x\text{PSub}+ n\text{PSWsub}/2+((mv\text{Disp}[0]+2)\!>\!>\!2))$$

$$y\text{RefSub}=\text{Clip3}(0,\text{PicHeightInSamples}_L-1,y\text{PSub}+ n\text{PSHSub}/2+((mv\text{Disp}[1]+2)\!>\!>\!2))$$

A block in the reference view that covers (xRefSub, yRefSub) is used as the reference block for current sub-PU.

For the identified reference block, if it is coded using temporal motion vectors, the following applies. If both refL0 and refL1 are equal to −1, and current sub-PU is not the first one in the raster scan order, the motion information of the reference block is inherited by all the previously sub-PUs. The associated motion parameters can be used as candidate motion parameters for the current sub-PU. The syntax element s tmvLX and refLX are updated to the motion information of the current sub-PU. Otherwise (e.g., if the reference block is intra coded), the motion information of current sub-PU is set to tmvLX and refLX. Different sub-PU block sizes may be applied, for example, 4×4, 8×8, and 16×16. The size of sub-PU may be signaled in VPS.

The following describes sub-PU level motion vector inheritance for depth coding. Similar to proposals for sub-PU level inter-view motion prediction from one texture view to another texture view, U.S. Provisional 61/858,089, filed Jul. 24, 2013, proposed techniques that apply sub-PU level motion prediction from one texture view to the corresponding depth view. That is, a current PU may be partitioned in several sub-PUs and each sub-PU uses the motion information of a co-located texture block for motion compensation. In this case, sub-PU level MVI is supported and the disparity vector used by inter-view motion prediction is considered to be always zero.

The current design for BVSP in 3D-HEVC exhibits the following problems. When AMP is used and the current PU size is 4×16 or 16×4, and the PU is uni-directionally predicted, BVSP is achieved by deriving one disparity vector for the whole PU. That is each sub-block in the PU uses the same disparity vector for reference block synthesis and motion compensation. As such, for larger block sizes, BVSP may be less efficient because using the same disparity vector for block synthesis and motion compensation for all sub-blocks may be less optimal for some of the sub-blocks.

As another drawback, when the current PU is bi-directionally predicted, BVSP is enabled with block sizes equal to 4×8 and 8×4. However, in HEVC, motion compensation for a blocks containing less than 64 pixels (e.g., 4×8 or 8×4 blocks) is not allowed (although 16×4 and 4×16 motion compensations are allowed).

In view of these drawbacks, this disclosure proposes techniques related to view synthesis prediction in 3D-HEVC, focusing on BVSP motion compensation sizes. In accordance with the techniques of this disclosure, for BVSP, each PU may be split into sub-blocks, and each sub-block may be associated with a different disparity motion vector and separately motion compensated. In this way, the accuracy of BVSP may be increased for blocks partitioned with AMP, and thus, coding efficiency may be increased. In accordance with the techniques of the disclosure, the size of sub-blocks available for use with BVSP may be further defined as follows.

In one example of the disclosure, when the current PU size is 16×4 (or 4×16), and the current PU is uni-directionally predicted, video encoder 20 and/or video decoder 30 may be configured to apply BVSP and motion compensation techniques to 8×4 (or 4×8) sub-blocks of the current PU. That is, the size of the BVSP sub-region is 8×4 (or 4×8). Each of the sub-blocks may be assigned with a disparity motion vector converted from a depth block.

Figure 17:
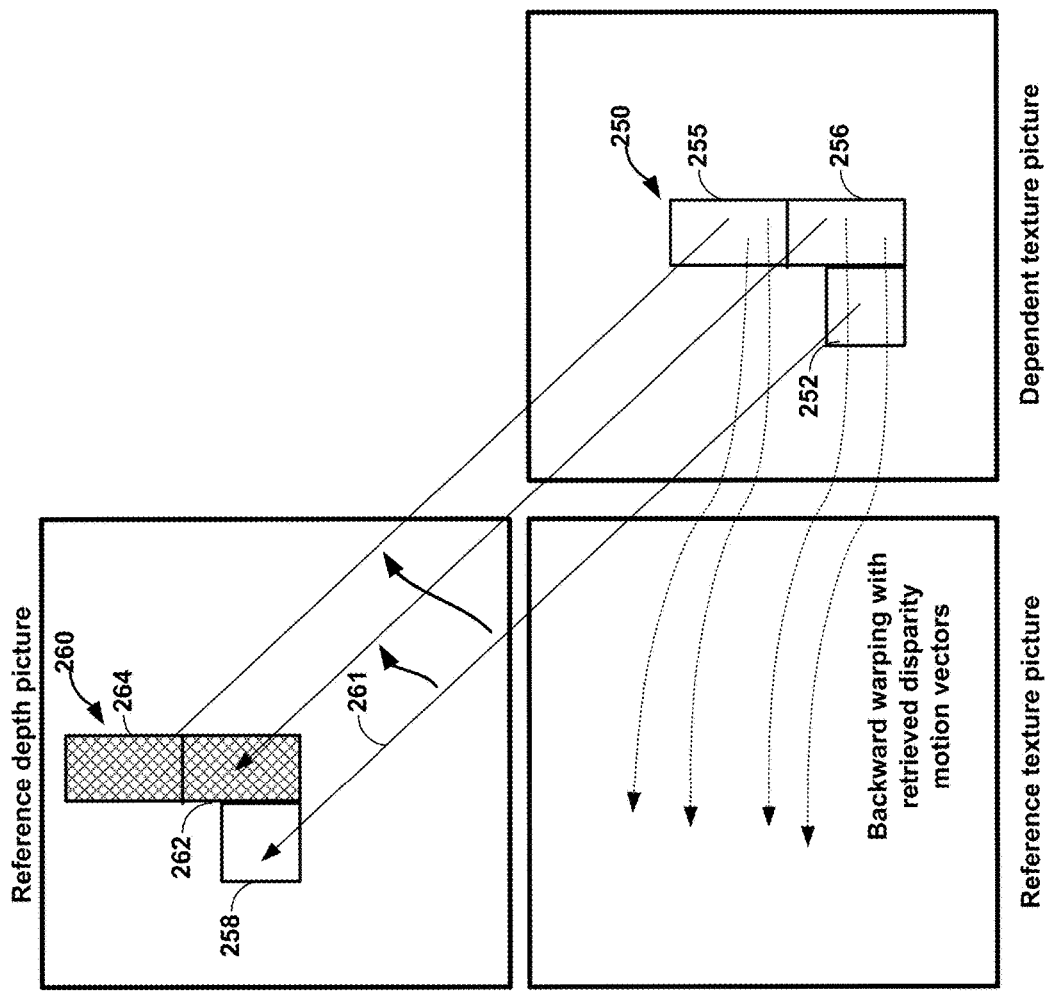
FIG. 17 is a conceptual drawing depicting backward view synthesis prediction and motion compensation techniques of this disclosure when using asymmetric motion partitioning.

FIG. 17 is a conceptual drawing depicting BVSP and motion compensation techniques of this disclosure when using AMP. In the example of FIG. 17, video encoder 20 and/or video decoder 30 asymmetrically partitions current PU 250 into a 4×16 block. Note that the 4×16 partitioning is just one example, and that the techniques of this disclosure described with reference to FIG. 17 may be applied to other asymmetric partitions, including a 16×4 partitions. Video encoder 20 and/or video decoder 30 may be configured to sub-divide PU 250 into 4×8 sub-blocks 255 and 256.

In the example of FIG. 17, video encoder 20 and/or video decoder 30 are configured to uni-directionally predict PU 250 using BVSP. In this regard, video encoder 20 and/or video decoder 30 may be configured to derive a disparity vector for PU 250, for example, using NBDV derivation techniques. For example, disparity vector 261 may be derived from neighboring block 252. Video encoder 20 and/or video decoder 30 may then be configured to reuse disparity vector 261 to locate a corresponding depth block 260 in a reference depth picture. In accordance with the techniques of this disclosure, rather than using the entirety of depth bock 260 to derive a single disparity motion vector for PU 255, video encoder 20 and/or video decoder 30 may be configured to derive a disparity motion vector from 4×8 sub-block 264 of depth block 260 for sub-block 255, and to derive a disparity motion vector from 4×8 sub-block 262 of depth block 26 for sub-block 256.

Video encoder 20 and/or video decoder 30 may then synthesize a reference block for each of sub-blocks 255 and 256 using the corresponding derived disparity motion vectors to perform motion compensation with the reference picture corresponding to the inter-view reference picture with a view order equal to refVIdxLX. By deriving individual disparity motion vectors for each of sub-blocks 255 and 256, more accurate reference views may be synthesized and the corresponding motion compensation process may be achieved increased coding gains.

In another example of the disclosure, when the current PU size is 16×12 (or 12×16), and the current PU is uni-directionally predicted, video encoder 20 and/or video decoder 30 may be configured to partition the current PU into 8×4 (or 4×8) sub-blocks (also called BVSP sub-regions) and derive a disparity motion vector for each sub-bock using BVSP.

In another example, the size of the BVS sub-regions may be assigned to 16×12 or 12×16. In still another example, each 16×12 (or 12×16) sub-block is further partitioned into a 16×8 (or 8×16) sub-block and two 8×4 (or 4×8) sub-blocks that are adjacent to the 16×4 (4×16) PU in the same CU. In another example, the 16×8 (or 8×16) sub-blocks may be further separated into two 8×8 sub-regions or four 4×8 (or 8×4) sub-regions based on, e.g., the 4 corners of corresponding depth block.

In another example of the disclosure, when both the height and width of the current PU are larger than or equal to 8, and the PU is bi-directionally predicted, video encoder 20 and/or video decoder 30 are configured to set the size of the BVSP sub-region to 8×8 instead of 4×8 or 8×4, as in previous proposals for 3D-HEVC. In another example, instead of using bi-predictive BVSP for PUs with sizes equal to 12×16 or 16×12, uni-predictive BVSP may be applied. In this case, the motion compensation size may be further set to 4×16 or 16×4. In another example, when the current PU size is 16×4 or 4×16, and the current PU is bi-directionally predicted, the size of the BVSP sub-region is set equal to the PU size.

Sub-PU motion prediction may exhibit the following drawbacks. In this context, sub-PU motion prediction may include the sub-PU motion prediction techniques proposed in JCT3V-E0184, as described above, as well as the extension of sub-PU motion prediction to MVI from texture view to depth view.

As one drawback, when asymmetric motion partitioning (AMP) is enabled, the current PU size is equal to, e.g., 4×16, 16×4, and the signaled sub-PU block size in the VPS is equal to 8×8, based on previous proposals for sub-PU motion prediction, such PUs will be split into two 4×8 or 8×4 sub-blocks. For each sub-block, the motion information from a reference block is inherited. The motion information may be identified by a disparity vector in a reference texture view for inter-view motion prediction or may be reused from a co-located texture block in the corresponding texture view for motion vector inheritance. In this example, 4×8 or 8×4 based bi-prediction may be invoked, which is not allowed by HEVC.

As another drawback, when AMP is enabled, the PU size is equal to, e.g., 12×16 or 16×12, and the signaled sub-PU block size (i.e., sub-block size) in VPS is equal to 8×8, based on previous proposals for sub-PU motion prediction, such PUs will be split into two 8×8 and two 4×8/8×4 sub-blocks. Similar to the above case, the 4×8/8×4 sub-blocks may use bi-prediction, which is not allowed by HEVC.

Techniques related to inter-view motion prediction and motion vector inheritance (for a depth PU) are proposed in this disclosure. The techniques of this disclosure may be applied in the context when a merge index indicates inter-view motion prediction or MVI. In particular, the inter-view motion prediction and/or MVI techniques of the disclosure include techniques for the further partitioning of AMP PUs into sub-blocks and obtaining separate motion information for each of the sub-blocks. In this way, the accuracy of inter-view motion prediction and/or MVI may be improved for each of the sub-blocks, and thus, coding efficiency may be increased.

In one example of the disclosure, when a current PU is coded using inter-view motion prediction and/or MVI, and the current PU size is equal to 4×16 or 16×4, video encoder 20 and/or video decoder 30 may be configured to split the PU into two 4×8 or 8×4 sub-blocks. For each of the sub-blocks, video encoder 20 and/or video decoder 30 may be configured to only obtain motion information from a reference block corresponding to a particular reference picture list (e.g., RefPicList0). The motion information corresponding to a reference block in RefPicList0 is inherited for the 4×8 or 8×4 sub-blocks. In this case, the sub-blocks are uni-directionally predicted from a picture in RefPicList0.

Figure 18:
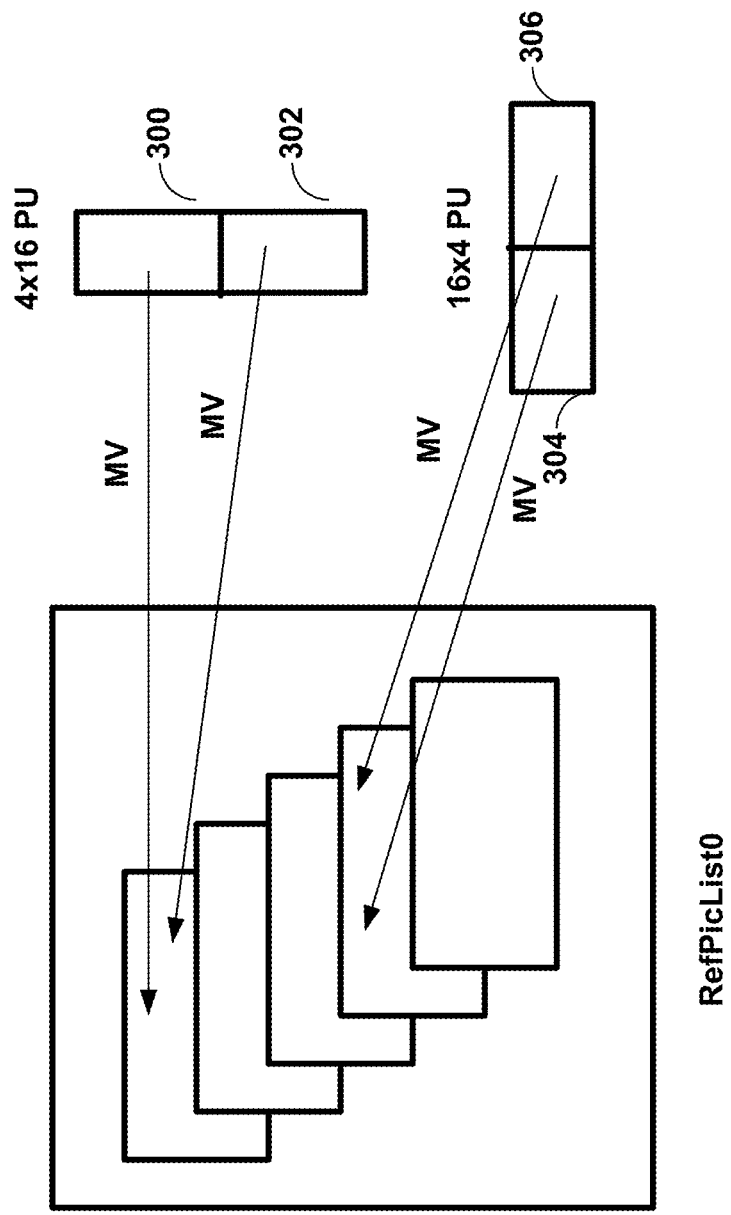
FIG. 18 is a conceptual diagram illustrating motion vector inheritance and motion compensation techniques for asymmetric motion partition sizes of 4×16 and 16×4.

FIG. 18 is a conceptual diagram illustrating motion vector inheritance and motion compensation techniques for PUs asymmetrically partitioned into sizes 4×16 and 16×4. For example, for a 4×16 PU, video encoder 20 and/or video decoder 30 are configured to further divide the 4×16 PU into two 4×8 sub-blocks 300 and 302. Motion information for each of sub-blocks 300 and 302 is obtained from a reference block in a reference picture belonging to a particular reference picture list (e.g., RefPicList0). Motion compensation is then performed for each of sub-blocks 300 and 302 relative to a reference block in RefPicList0. Likewise, for a 16×4 PU, video encoder 20 and/or video decoder 30 are configured to further divide the 16×5 PU into two 8×4 sub-blocks 304 and 306. Motion information for each of sub-blocks 304 and 306 is obtained from a reference block in a reference picture belonging to a particular reference picture list (e.g., RefPicList0). Motion compensation is then performed for each of sub-blocks 304 and 306 relative to a reference block in RefPicList0

In another example of the disclosure, when the current PU size is one of 16×12, 12×16, 4×16, or 16×4, video encoder 20 and video decoder 30 are configured to not use bi-prediction for 8×4/4×8 sub-blocks when sub-PU level inter-view motion prediction and/or MVI (for depth) is applied. That is, when the current PU size is one of 16×12, 12×16, 4×16, or 16×4, video encoder 20 and video decoder 30 are configured to only use uni-prediction for 8×4/4×8 sub-blocks when sub-PU level inter-view motion prediction and/or MVI (for depth) is applied.

In another example of the disclosure, it is proposed that when sub-PU level inter-view motion prediction or MVI is applied, and the current PU size is equal to 4×16 or 16×4, the PU is not split into sub-PUs.

In another example of the disclosure, it is proposed that when sub-PU level inter-view motion prediction or MVI is applied, and the current PU size is equal to 12×16 or 16×12, the PU is split into three equal-sized sub-PU blocks with a size equal to 4×16 or 16×4. For each sub-PU block, the motion information of the corresponding reference block is inherited.

In another example of the disclosure, when the current PU size is equal to 12×16 or 16×12, the PU is split to two 8×8 and one 4×16 or 16×4 sub-PU blocks, wherein the 8×8 sub-PUs form the left or top half of the CU containing this PU. In another aspect of this example, the 4×16 and 16×4 sub-blocks are further split into two 4×8 or 8×4 sub-PU blocks. For each 4×8 or 8×4 sub-PU, only the motion information of a reference block corresponding to reference picture list (RefPicList0) is obtained and reused for the 4×8 or 8×4 sub-PU. In this case, the sub-PUs are uni-directionally predicted from a picture in RefPicList0.

In another example of the disclosure, when BVSP is used for a PU with a size equal to 12×16 or 16×12, the PU is split into three equal-sized sub-PU blocks with sizes equal to 4×16 or 16×4. Video encoder 20 and/or video decoder 30 may then derive a unique disparity motion vector for ach sub-PU from the corresponding depth block.

Figure 19:
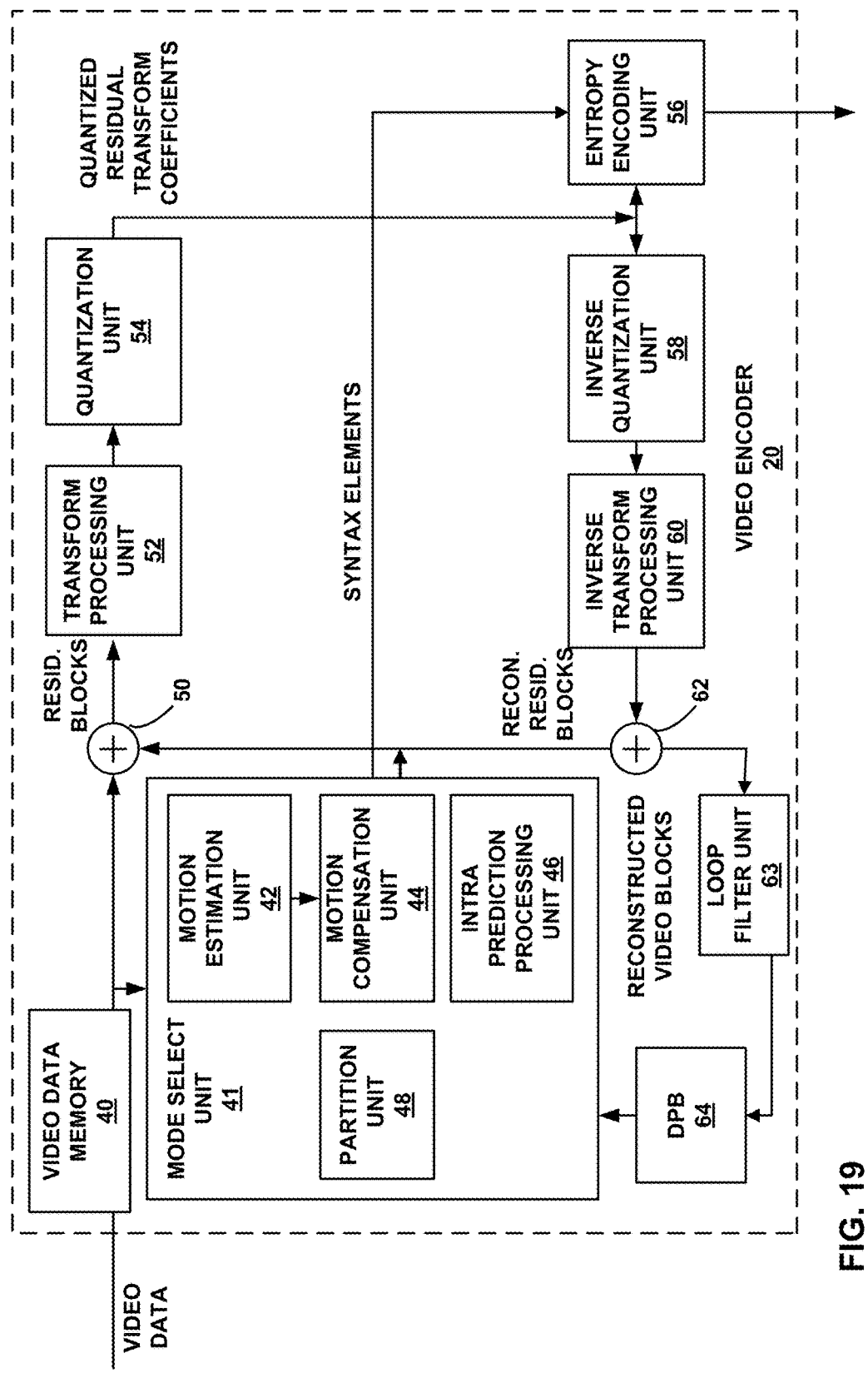
FIG. 19 is a block diagram illustrating an example of a video encoder that may implement the inter-prediction techniques of this disclosure.

FIG. 19 is a block diagram illustrating an example of video encoder 20 that may implement the techniques of this disclosure. Video encoder 20 may perform intra- and inter-coding (including inter-view coding) of video blocks within video slices, e.g., slices of both texture images and depth maps. Texture information generally includes luminance (brightness or intensity) and chrominance (color, e.g., red hues and blue hues) information. In general, video encoder 20 may determine coding modes relative to luminance slices, and reuse prediction information from coding the luminance information to encode chrominance information (e.g., by reusing partitioning information, intra-prediction mode selections, motion vectors, or the like). Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 19, video encoder 20 receives a current video block (that is, a block of video data, such as a luminance block, a chrominance block, or a depth block) within a video frame (e.g., a texture image or a depth map) to be encoded. In the example of FIG. 19, video encoder 20 includes video data memory 40, mode select unit 41, decoded picture buffer (DPB) 64, summer 50, transform processing unit 52, quantization unit 54, loop filter unit 63, and entropy encoding unit 56. Mode select unit 41, in turn, includes motion compensation unit 44, motion estimation unit 42, intra-prediction processing unit 46, and partition unit 48. For video block reconstruction, video encoder 20 also includes inverse quantization unit 58, inverse transform processing unit 60, and summer 62. Loop filter unit 63 may include a deblocking filter and an SAO filter to filter block boundaries to remove blockiness artifacts from reconstructed video. Additional filters (in loop or post loop) may also be used in addition to the deblocking filter. Such filters are not shown for brevity, but if desired, may filter the output of summer 50 (as an in-loop filter).

Video data memory 40 may store video data to be encoded by the components of video encoder 20. The video data stored in video data memory 40 may be obtained, for example, from video source 18. DPB 64 is a buffer that stores reference video data for use in encoding video data by video encoder 20 (e.g., in intra or inter coding modes, also referred to as intra or inter prediction coding modes). Video data memory 40 and DPB 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 40 and DPB 64 may be provided by the same memory device or separate memory devices. In various examples, video data memory 40 may be on-chip with other components of video encoder 20, or off-chip relative to those components.

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames, including inter-view reference frames, to provide temporal prediction. Intra-prediction processing unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 41 may further produce a quadtree data structure indicative of partitioning of an LCU into sub-CUs. Leaf-node CUs of the quadtree may include one or more PUs and one or more TUs.

Mode select unit 41 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 41 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit).

A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in DPB 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in DPB 64. The reference picture lists may be constructed using the techniques of this disclosure. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. In this manner, motion compensation unit 44 may reuse motion information determined for luma components to code chroma components such that motion estimation unit 42 need not perform a motion search for the chroma components. Mode select unit 41 may also generate syntax elements associated with the video blocks and the video slice for use by video decoder 30 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 (or mode select unit 41, in some examples) may select an appropriate intra-prediction mode to use from the tested modes.

For example, intra-prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

After selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 41 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients.

The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform processing unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of DPB 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in DPB 64. The reconstructed video block may be used by motion estimation unit 42 and motion compensation unit 44 as a reference block to inter-code a block in a subsequent video frame.

Video encoder 20 may encode depth maps in a manner that substantially resembles coding techniques for coding luminance components, albeit without corresponding chrominance components. For example, intra-prediction processing unit 46 may intra-predict blocks of depth maps, while motion estimation unit 42 and motion compensation unit 44 may inter-predict blocks of depth maps. However, as discussed above, during inter-prediction of depth maps, motion compensation unit 44 may scale (that is, adjust) values of reference depth maps based on differences in depth ranges and precision values for the depth ranges. For example, if different maximum depth values in the current depth map and a reference depth map correspond to the same real-world depth, video encoder 20 may scale the maximum depth value of the reference depth map to be equal to the maximum depth value in the current depth map, for purposes of prediction. Additionally or alternatively, video encoder 20 may use the updated depth range values and precision values to generate a view synthesis picture for view synthesis prediction, e.g., using techniques substantially similar to inter-view prediction.

As will be discussed in more detail below with reference to FIGS. 21-23, video encoder 20 may be configured to employ the techniques of this disclosure described above. In particular, video encoder 20 may be configured to partition PUs into sub-blocks when such PUs are partitioned according to an asymmetric partitioning mode. Video encoder 20 may then be configured to inherit and/or derive motion vectors or disparity motion vectors for each of the sub-blocks.

Figure 20:
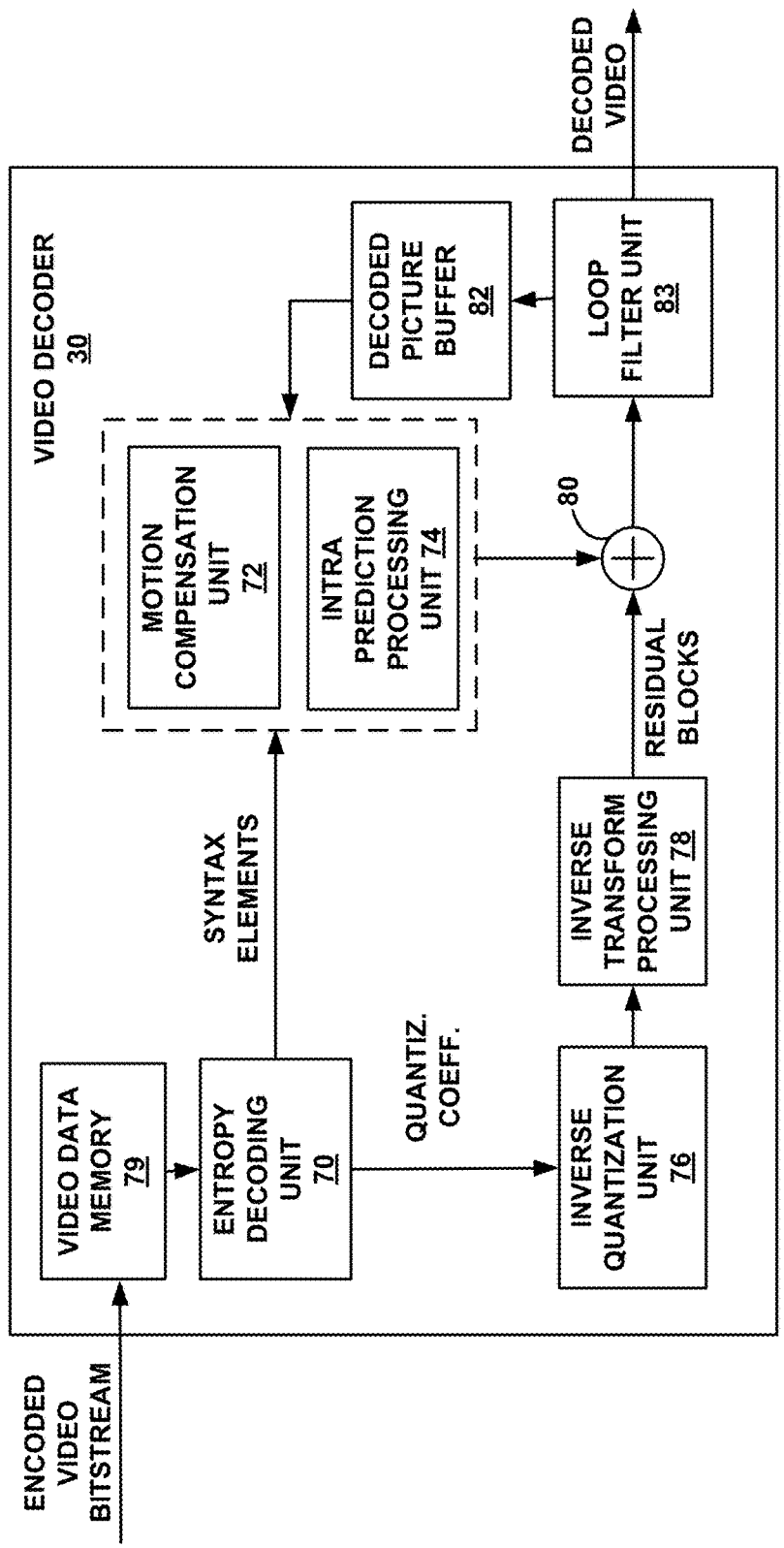
FIG. 20 is a block diagram illustrating an example of a video decoder that may implement the inter-prediction techniques of this disclosure.

FIG. 20 is a block diagram illustrating an example of video decoder 30 that may implement the techniques of this disclosure. In the example of FIG. 20, video decoder 30 includes video data memory 79, entropy decoding unit 70, motion compensation unit 72, intra prediction processing unit 74, inverse quantization unit 76, inverse transform processing unit 78, decoded picture buffer (DPB) 82, loop filter unit 83, and summer 80. Video decoder 30 may, in some examples, perform a decoding pass generally reciprocal to the encoding pass described with respect to video encoder 20 (FIG. 19). Motion compensation unit 72 may generate prediction data based on motion vectors received from entropy decoding unit 70, while intra-prediction processing unit 74 may generate prediction data based on intra-prediction mode indicators received from entropy decoding unit 70.

Video data memory 79 may store video data, such as an encoded video bitstream, to be decoded by the components of video decoder 30. The video data stored in video data memory 79 may be obtained from a local video source, such as a camera, via wired or wireless network communication of video data, or by accessing physical data storage media. Video data memory 79 may form a coded picture buffer (CPB) that stores encoded video data from an encoded video bitstream. DPB 82 is one example of a DPB that stores reference video data for use in decoding video data by video decoder 30 (e.g., in intra or inter coding modes, also referred to as intra or inter prediction coding modes). Video data memory 79 and DPB 82 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 79 and DPB 82 may be provided by the same memory device or separate memory devices. In various examples, video data memory 79 may be on-chip with other components of video decoder 30, or off-chip relative to those components.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction processing unit 74 may generate prediction data for a video block of the current video slice based on a signaled intra prediction mode and data from previously decoded blocks of the current frame or picture. When the video frame is coded as an inter-coded (i.e., B, P or GPB)

slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using the techniques of this disclosure based on reference pictures stored in decoded picture buffer 82. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform processing unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform processing unit 78 with the corresponding predictive blocks generated by motion compensation unit 72. Summer 90 represents the component or components that perform this summation operation. Loop filter unit 63 may include a deblocking filter and an SAO filter to filter block boundaries to remove blockiness artifacts from reconstructed video. Additional filters (in loop or post loop) may also be used in addition to the deblocking filter. Such filters are not shown for brevity, but if desired, may filter the output of summer 80 (as an in-loop filter). The decoded video blocks in a given frame or picture are then stored in decoded picture buffer 82, which stores reference pictures used for subsequent motion compensation. Decoded picture buffer 82 also stores decoded video for later presentation on a display device, such as display device 32 of FIG. 1.

As will be discussed in more detail below with reference to FIGS. 24-26, video decoder 30 may be configured to employ the techniques of this disclosure described above. In particular, video decoder 30 may be configured to partition PUs into sub-blocks when such PUs are partitioned according to an asymmetric partitioning mode. Video decoder 30 may then be configured to inherit and/or derive motion vectors or disparity motion vectors for each of the sub-blocks.

Figure 21:
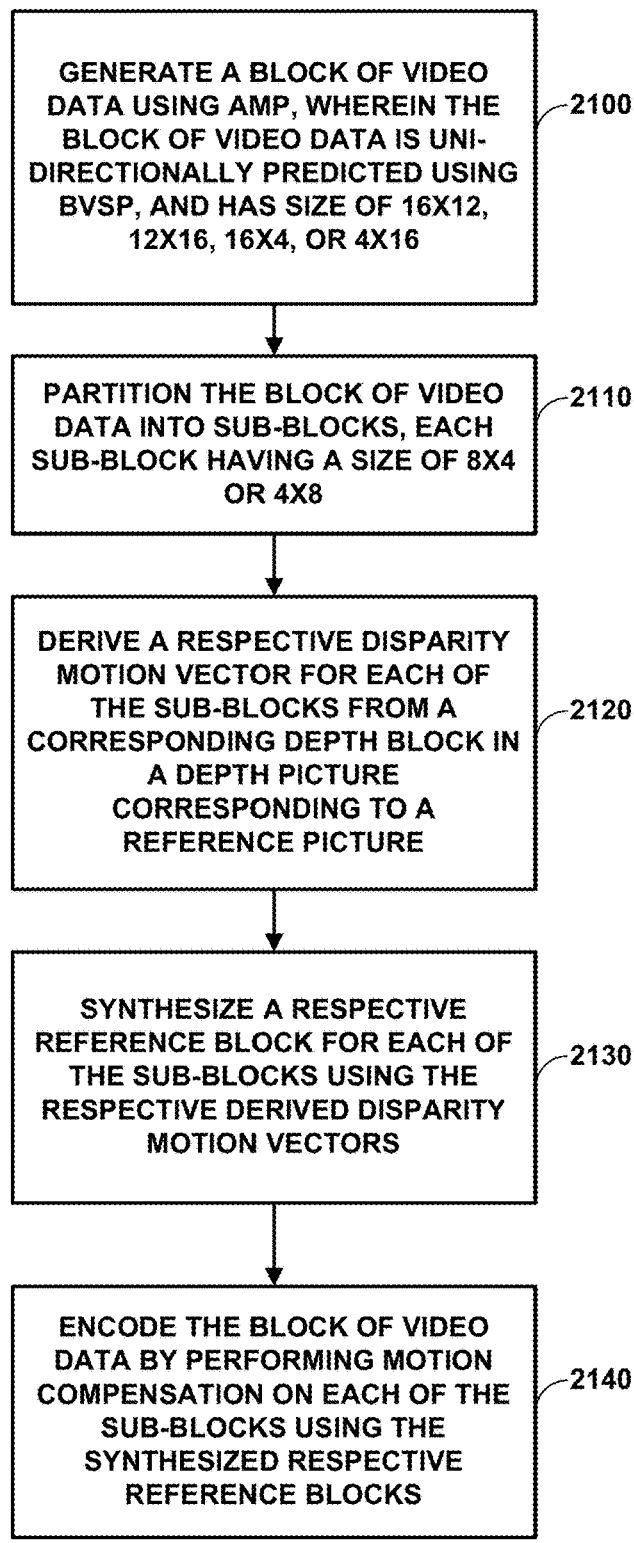
FIG. 21 is a flowchart illustrating an example encoding method of the disclosure.

FIG. 21 is a flowchart illustrating an example encoding method of the disclosure. The techniques of FIG. 21 may be implemented by one or more structural units of video encoder 20, such as by mode select unit 41, partition unit 48 and/or motion compensation unit 44.

In one example of the disclosure, video encoder 20 (e.g., using mode select unit 41 and partition unit 48) may be configured to generate a block of video data using AMP, wherein the block of video data is uni-directionally predicted using BVSP, and has a size of 16×12, 12×16, 16×4 or 4×16 (2100). In one example of the disclosure, the block of video data is a prediction unit.

Video encoder 20, using partition unit 48, may be further configured to partition the block of video data into sub-blocks, each sub-block having a size of 8×4 or 4×8 (2110), and derive (e.g., using motion compensation unit 44) a respective disparity motion vector for each of the sub-blocks from a corresponding depth block in a depth picture corresponding to a reference picture (2120). Video encoder 20 (e.g., using motion compensation unit 44) may be further configured to synthesize a respective reference block for each of the sub-blocks using the respective derived disparity motion vectors (2130), and encode (e.g., using motion compensation unit 44) the block of video data by performing motion compensation on each of the sub-blocks using the synthesized respective reference blocks (2140).

In another example of the disclosure, video encoder 20 may be further configured to generate one or more syntax element indicating that the prediction unit is encoded using AMP, and indicating that the prediction unit is uni-directionally predicted using BVSP, and generate a merge candidate index pointing to a BVSP candidate.

In another example of the disclosure, video encoder 20 (e.g., using motion compensation unit 44) may be configured to derive the respective disparity motion vector for each of the sub-blocks by deriving a disparity vector for the block of video data, locating the corresponding depth block for each of the sub-blocks using the derived disparity vector, and converting one selected depth value of the corresponding depth block for each of the sub-blocks to the respective disparity motion vector.

Figure 22:
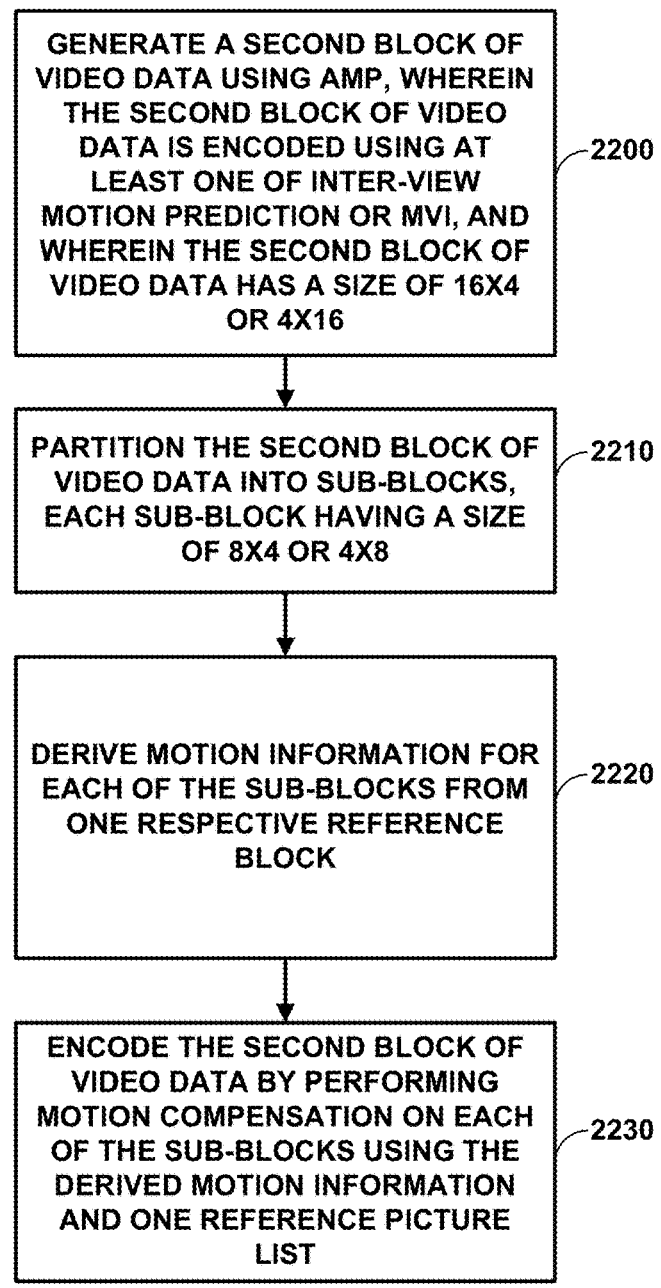
FIG. 22 is a flowchart illustrating another example encoding method of the disclosure.

FIG. 22 is a flowchart illustrating another example encoding method of the disclosure. The techniques of FIG. 22 may be implemented by one or more structural units of video encoder 20, including mode select unit 41, partition unit 48 and/or motion compensation unit 44.

In one example of the disclosure, video encoder 20 (e.g., mode select unit 41 and partition unit 48) may be configured to generate a second block of video data using AMP, wherein the second block of video data is encoded using at least one of inter-view motion prediction or MVI, and has a size 16×4 or 4×16 (2200). Video encoder 20 (e.g., using partition unit 48) may be further configured to partition the second block of video data into sub-blocks, each sub-block having a size of 8×4 or 4×8 (2210), and derive (e.g., using motion compensation unit 44) motion information for each of the sub-blocks from one respective reference block (2220). Video encoder 20 may then encode the second block of video data by performing motion compensation on each of the sub-blocks using the derived motion information and one reference picture list (2230).

In another example of the disclosure, video encoder 20 (e.g., using motion compensation unit 44) may be configured to perform motion compensation by performing uni-directional motion compensation relative to a picture in the one reference picture list.

Figure 23:
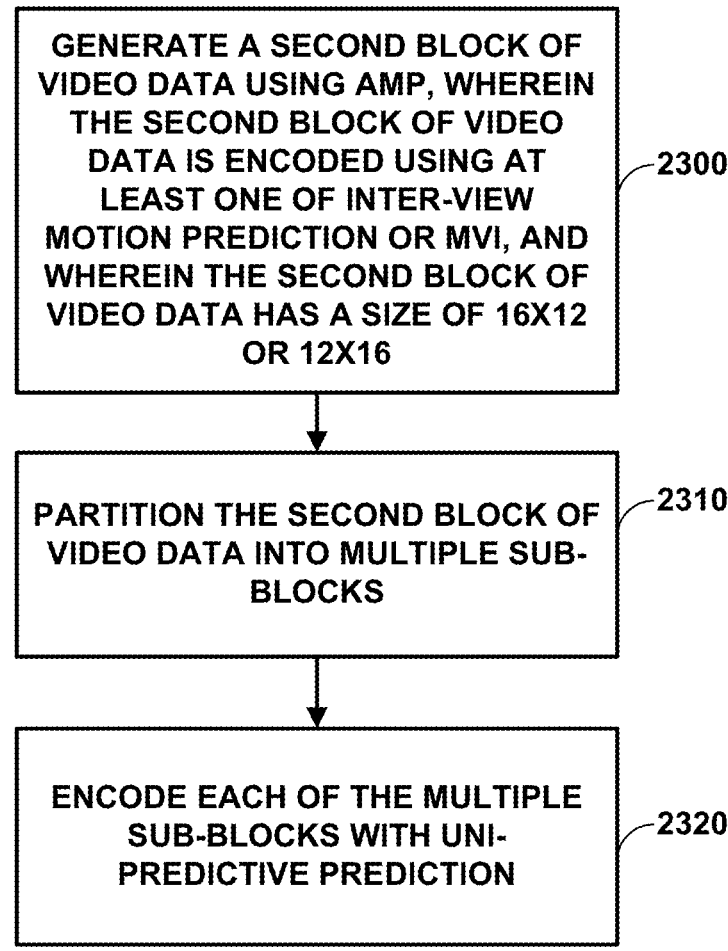
FIG. 23 is a flowchart illustrating another example encoding method of the disclosure.

FIG. 23 is a flowchart illustrating another example encoding method of the disclosure. The techniques of FIG. 23 may be implemented by one or more structural units of video encoder 20, such as by mode select unit 41, partition unit 48 and/or motion compensation unit 44.

In one example of the disclosure, video encoder 20 may be configured to generate 20 (e.g., using mode select unit 41 and partition unit 48) a second block of video data using AMP, wherein the second block of video data is encoded using at least one of inter-view motion prediction or motion vector inheritance, and has a size 16×12 or 12×16 (2300), partition (e.g., using partition unit 48) the second block of video data into multiple sub-blocks (2310), and encode (e.g., using motion compensation unit 44) each of the multiple sub-blocks with uni-predictive prediction (2320).

Figure 24:
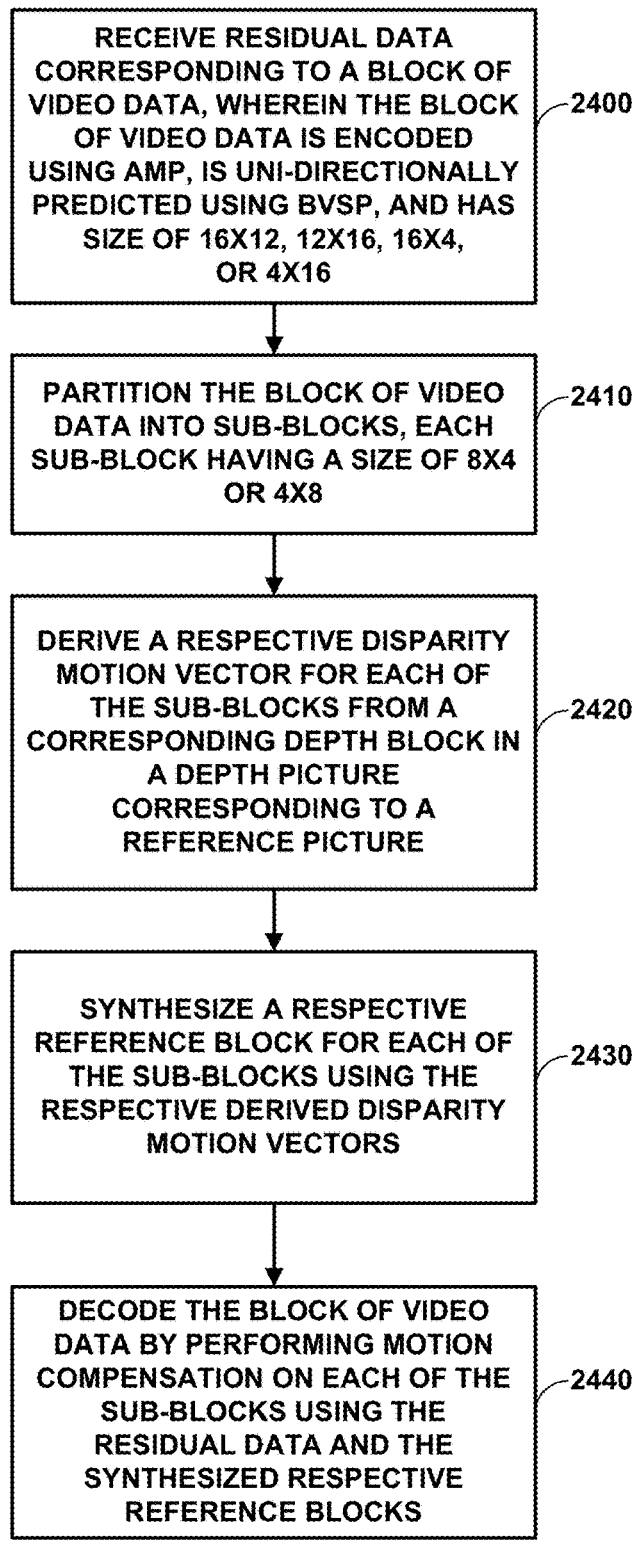
FIG. 24 is a flowchart illustrating an example decoding method of the disclosure.

FIG. 24 is a flowchart illustrating an example decoding method of the disclosure. The techniques of FIG. 24 may be implemented by one or more structural units of video decoder 30, such as by motion compensation unit 72.

In one example of the disclosure, video decoder 30 may be configured to receive residual data corresponding to a block of video data, wherein the block of video data is encoded using AMP, is uni-directionally predicted using BVSP, and has a size of 16×12, 12×16, 16×4 or 4×16 (2400). In one example of the disclosure, the block of video data is a prediction unit. Video decoder 30 may be further configured to partition the block of video data into sub-blocks, each sub-block having a size of 8×4 or 4×8 (2410), and derive a respective disparity motion vector for each of the sub-blocks from a corresponding depth block in a depth picture corresponding to a reference picture (2420).

Video decoder 30 may be further configured to synthesize a respective reference block for each of the sub-blocks using the respective derived disparity motion vectors (2430), and decode the block of video data by performing motion compensation on each of the sub-blocks using the residual data and the synthesized respective reference blocks (2440).

In another example of the disclosure, video decoder 30 may be further configured to receive one or more syntax element indicating that the prediction unit is encoded using asymmetric motion partitioning, and indicating that the prediction unit is uni-directionally predicted using backward view synthesis prediction, and receive a merge candidate index pointing to a BVSP candidate.

In another example of the disclosure, video decoder 30 may be further configured to derive the respective disparity motion vector for each of the sub-blocks by deriving a disparity vector for the block of video data, locating the corresponding depth block for each of the sub-blocks using the derived disparity vector, and converting one selected depth value of the corresponding depth block for each of the sub-blocks to the respective disparity motion vector.

Figure 25:
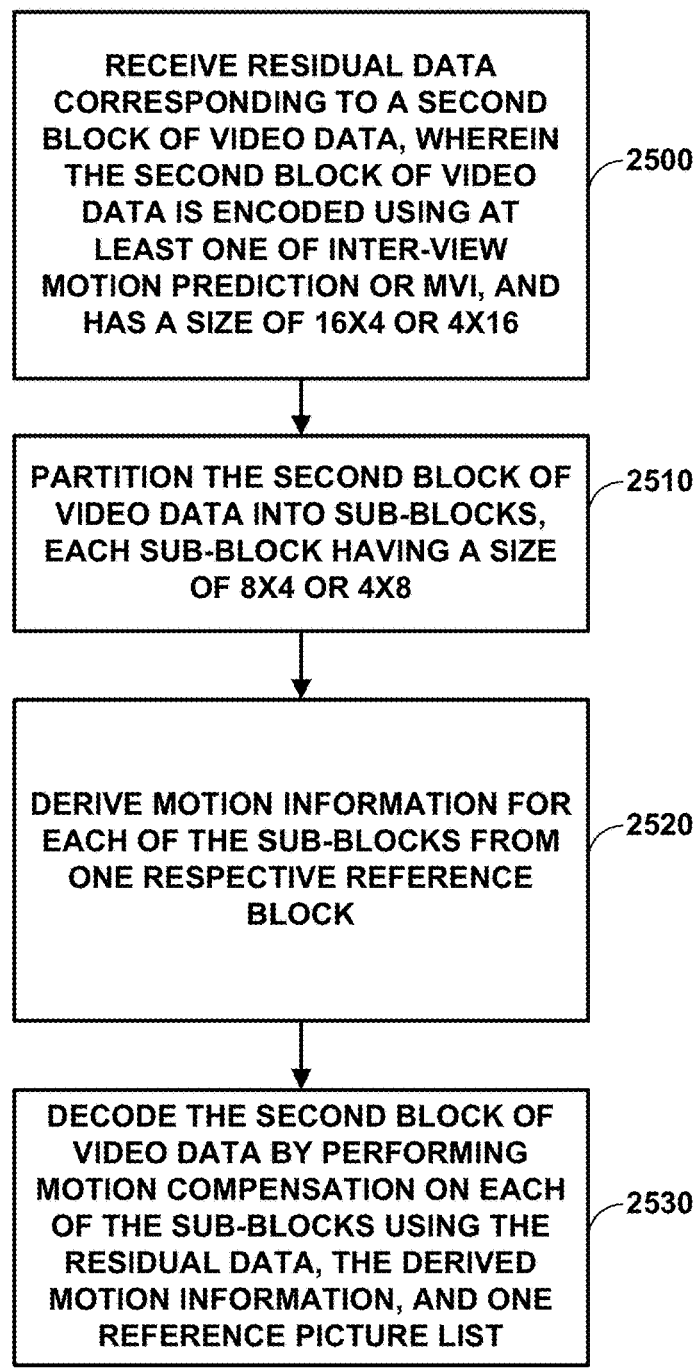
FIG. 25 is a flowchart illustrating an example decoding method of the disclosure.

FIG. 25 is a flowchart illustrating an example decoding method of the disclosure. The techniques of FIG. 23 may be implemented by one or more structural units of video decoder 30, such as by motion compensation unit 72.

In one example of the disclosure, video decoder 30 may be configured to receive residual data corresponding to a second block of video data, wherein the second block of video data is encoded using at least one of inter-view motion prediction or MVI, and has a size 16×4 or 4×16 (2500), partition the second block of video data into sub-blocks, each sub-block having a size of 8×4 or 4×8 (2510), derive motion information for each of the sub-blocks from one respective reference block (2520), and decode the second block of video data by performing motion compensation on each of the sub-blocks using the residual data, the derived motion information, and one reference picture list.

In another example of the disclosure, video decoder 30 may be further configured to perform motion compensation by performing uni-directional motion compensation relative to a picture in the one reference picture list.

Figure 26:
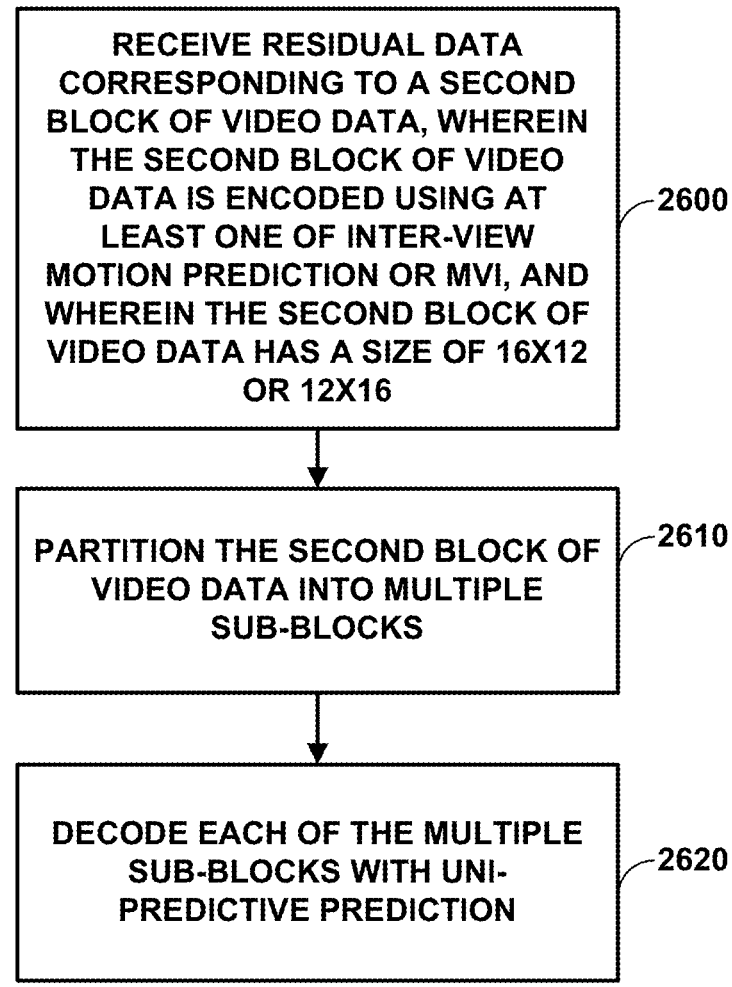
FIG. 26 is a flowchart illustrating an example decoding method of the disclosure.

FIG. 26 is a flowchart illustrating an example decoding method of the disclosure. The techniques of FIG. 23 may be implemented by one or more structural units of video decoder 30, including motion compensation unit 72.

In one example of the disclosure, video decoder 30 may be further configured to receive residual data corresponding to a second block of video data, wherein the second block of video data is encoded using at least one of inter-view motion prediction or MVI, and has a size 16×12 or 12×16 (2600), partition the second block of video data into multiple sub-blocks (2610), and decode each of the multiple sub-blocks with uni-predictive prediction.

As explained above, the techniques of this disclosure include video encoding and decoding techniques when applying AMP, BVSP, inter-view motion prediction, and/or MVI on blocks of video data. In particular, the techniques of this disclosure provide for more accurate coding by directing coding techniques to sub-blocks of PUs partitioned with AMP. For example, obtaining separate disparity motion vectors for sub-blocks of a PU partitioned with AMP when such a PU is coded using BVSP may increase the accuracy of view synthesis and motion prediction, and thus, coding efficiency. AS another example, obtaining separate motion information for sub-blocks of a PU partitioned with AMP when such a PU is coded using inter-view motion prediction and/or MVI may increase the accuracy of motion prediction, and thus coding efficiency.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
receiving, in an encoded video bitstream, residual data corresponding to a prediction unit of the video data that is encoded according to an asymmetric motion partitioning (AMP) mode, is uni-directionally predicted using backward view synthesis prediction (BVSP), and has a size of 16×12, 12×16, 16×4, or 4×16;
receiving, in the encoded video bitstream, data indicating that the prediction unit is uni-directionally predicted according to the BVSP;
obtaining a single set of motion information for an entirety of the prediction unit;
deriving a single disparity vector for the entirety of the prediction unit based on the single set of motion information obtained for the entirety of the prediction unit;
partitioning the prediction unit according to the AMP mode to form a plurality of sub-blocks, each sub-block having a size of 8×4 or 4×8, and each sub-block having a respective set of motion information;
deriving a respective disparity motion vector for each sub-block of the plurality of sub-blocks from a corresponding depth block in a depth picture corresponding to a reference picture, wherein the deriving is based on the prediction unit being uni-directionally predicted according to the BVSP, and wherein the deriving uses the single set of motion information obtained for the entirety of the prediction unit;
synthesizing a respective reference block for each sub-block of the plurality of sub-blocks using the respective derived disparity motion vector; and
decoding the prediction unit by performing motion compensation on each of the sub-blocks using the residual data and the synthesized respective reference blocks.

2. The method of claim 1, further comprising:
receiving one or more syntax elements indicating that the prediction unit is encoded according to the AMP mode; and
receiving a merge candidate index pointing to a BVSP candidate included in a merge candidate list.

3. The method of claim 1, wherein deriving the respective disparity motion vector for each sub-block comprises:
locating the corresponding depth block for each sub-block of the plurality of sub-blocks using the single disparity vector derived for the prediction unit; and
converting one selected depth value of the corresponding depth block for each sub-block of the plurality of sub-blocks to the respective disparity motion vector.

4. The method of claim 1, wherein the prediction unit is a first prediction unit, and wherein the plurality of sub-blocks is a first plurality of sub-blocks, the method further comprising:
receiving residual data corresponding to a second prediction unit, wherein the second prediction unit is encoded using at least one of inter-view motion prediction or motion vector inheritance, and has a size of 16×4 or 4×16;
partitioning the second prediction unit into a second plurality of sub-blocks, each respective sub-block of the second plurality of sub-blocks having a size of 8×4 or 4×8;
deriving motion information for each sub-block of the second plurality of sub-blocks from one respective reference block; and
decoding the second prediction unit by performing motion compensation on each sub-block of the second plurality of sub-blocks using the residual data, the derived motion information, and one reference picture list.

5. The method of claim 4, wherein performing the motion compensation comprises performing uni-directional motion compensation relative to a picture in the one reference picture list.

6. The method of claim 1, wherein the prediction unit is a first prediction unit, and wherein the plurality of sub-blocks is a first plurality of sub-blocks, the method further comprising:
receiving residual data corresponding to a second prediction unit, wherein the second prediction unit is encoded using at least one of inter-view motion prediction or motion vector inheritance, and has a size 16×12 or 12×16;
partitioning the second prediction unit of video data into a second plurality of sub-blocks; and
decoding each sub-block of the second plurality of sub-blocks with uni-predictive prediction.

7. The method of claim 1, wherein obtaining the single set of motion information for the entirety of the prediction unit comprises receiving the single set of motion information in the encoded video bitstream, and wherein decoding the prediction unit comprises decoding the prediction unit according to a merge mode.

8. The method of claim 1, wherein obtaining the single set of motion information for the entirety of the prediction unit comprises deriving the single set of motion information, and wherein decoding the prediction unit comprises decoding the prediction unit according to an advanced motion vector prediction (AMVP) mode.

9. A method of encoding video data, the method comprising:
generating a prediction unit according to an asymmetric motion partitioning (AMP) mode, such that the prediction unit is uni-directionally predicted using backward view synthesis prediction (BVSP), and has a size of 16×12, 12×16, 16×4, or 4×16;
partitioning the prediction unit according to the AMP mode to form a plurality of sub-blocks, each sub-block having a size of 8×4 or 4×8, and each sub-block having a respective set of motion information;
deriving a respective disparity motion vector, based on the respective set of motion information, for each sub-block of the plurality of sub-blocks from a corresponding depth block in a depth picture corresponding to a reference picture;
synthesizing a respective reference block for each sub-block of the plurality of sub-blocks partitioned from the prediction unit, using the respective derived disparity motion vectors;
encoding the prediction unit by performing motion compensation on each sub-block of the plurality of sub-blocks using the synthesized respective reference blocks; and
performing one of:
signaling, in an encoded video bitstream, a single set of motion information for an entirety of the encoded prediction unit; or
inheriting, for the entirety of the encoded prediction unit, the single set of motion information from one or more neighboring blocks of the encoded prediction unit.

10. The method of claim 9, further comprising:
generating one or more syntax elements indicating that the prediction unit is encoded according to the AMP mode; and
generating a merge candidate index pointing to a BVSP candidate in a candidate list.

11. The method of claim 9, wherein deriving the respective disparity motion vector for each of the sub-blocks comprises:
locating the corresponding depth block for each of the sub-blocks using the single disparity vector derived for the prediction unit; and
converting one selected depth value of the corresponding depth block for each of the sub-blocks to the respective disparity motion vector.

12. The method of claim 9, wherein the prediction unit is a first prediction unit, the method further comprising:
generating a second prediction unit according to the AMP mode, such that the second prediction unit is encoded using at least one of inter-view motion prediction or motion vector inheritance, and has a size of 16×4 or 4×16;
partitioning the second prediction unit to form a second plurality of sub-blocks, each sub-block of the second plurality of sub-blocks having a size of 8×4 or 4×8;
deriving motion information for each sub-block of the second plurality of sub-blocks from one respective reference block; and
encoding the second prediction unit by performing motion compensation on each sub-block of the second plurality of sub-blocks using the derived motion information and one reference picture list.

13. The method of claim 12, wherein performing the motion compensation comprises performing uni-directional motion compensation relative to a picture in the one reference picture list.

14. The method of claim 9, wherein the prediction unit is a first prediction unit, the method further comprising:
generating a second prediction unit according to the AMP mode, wherein the second prediction unit is encoded using at least one of inter-view motion prediction or motion vector inheritance, and has a size 16×12 or 12×16;
partitioning the second prediction unit to form a second plurality of sub-blocks; and
encoding each sub-block of the second plurality of sub-blocks with uni-predictive prediction.

15. An apparatus configured to decode video data, the apparatus comprising:
a communications interface configured to receive an encoded video bitstream;
a memory coupled to the communications interface and configured to store the encoded video bitstream, the encoded video bitstream comprising residual data corresponding to a prediction unit; and
one or more processors in communication with the memory device, the one or more processors being configured to:
retrieve, from the encoded video bitstream memory, the residual data corresponding to the prediction unit, wherein the prediction unit is encoded according to an asymmetric motion partitioning (AMP) coding tool, is uni-directionally predicted using backward view synthesis prediction (BVSP), and has a size of 16×12, 12×16, 16×4, or 4×16;
retrieve, from the encoded video bitstream stored to the memory, data indicating that the prediction unit is uni-directionally predicted according to the BVSP;
obtain a single set of motion information for an entirety of the prediction unit;
derive a single disparity vector for the entirety of the prediction unit based on the single set of motion information obtained for the entirety of the prediction unit;
partition the prediction unit according to the AMP mode to form a plurality of sub-blocks, each sub-block having a size of 8×4 or 4×8, and each sub-block having a respective set of motion information;
derive a respective disparity motion vector for each sub-block of the plurality of sub-blocks from a corresponding depth block in a depth picture corresponding to a reference picture, wherein to derive the respective disparity motion vector, the one or more processors are configured to derive the respective disparity motion vector based on the prediction unit being uni-directionally predicted according to the BVSP, and wherein to derive the respective disparity motion vector, the one or more processors are configured to use the single set of motion information obtained for the entirety of the prediction unit;

synthesize a respective reference block for each sub-block of the plurality of sub-blocks using the respective derived disparity motion vector; and decode the prediction unit by performing motion compensation on each of the sub-blocks using the residual data and the synthesized respective reference blocks.

16. The apparatus of claim 15, wherein the one or more processors are further configured to:
receive one or more syntax elements indicating that the prediction unit is encoded according to the AMP mode; and
receive a merge candidate index pointing to a BVSP candidate included in a merge candidate list.

17. The apparatus of claim 15, wherein to derive the respective disparity motion vector for each sub-block, the one or more processors are further configured to:
locate the corresponding depth block for each sub-block of the plurality of sub-blocks using the single disparity vector derived for the prediction unit; and
convert one selected depth value of the corresponding depth block for each sub-block of the plurality of sub-blocks to the respective disparity motion vector.

18. The apparatus of claim 15, wherein the prediction unit is a first prediction unit, wherein the plurality of sub-blocks is a first plurality of sub-blocks, and wherein the one or more processors are further configured to:
receive residual data corresponding to a second prediction unit, wherein the second prediction unit is encoded using at least one of inter-view motion prediction or motion vector inheritance, and has a size of 16×4 or 4×16;
partition the second prediction unit to form a second plurality of sub-blocks, each respective sub-block of the second plurality of sub-blocks having a size of 8×4 or 4×8;
derive motion information for each sub-block of the second plurality of sub-blocks from one respective reference block; and
decode the second prediction unit by performing motion compensation on each sub-block of the second plurality of sub-blocks using the residual data, the derived motion information, and one reference picture list.

19. The apparatus of claim 18, wherein to perform the motion compensation, the one or more processors are further configured to perform uni-directional motion compensation relative to a picture in the one reference picture list.

20. The apparatus of claim 15, wherein the prediction unit is a first prediction unit, wherein the plurality of sub-blocks is a first plurality of sub-blocks, and wherein the one or more processors are further configured to:
receive residual data corresponding to a second prediction unit, wherein the second prediction unit is encoded using at least one of inter-view motion prediction or motion vector inheritance, and has a size of 16×12 or 12×16;
partition the second prediction unit of video data into a second plurality of sub-blocks; and decode each sub-block of the second plurality of sub-blocks with uni-predictive prediction.

21. The apparatus of claim 15, further comprising:
a display device configured to display decoded video data based on the decoded prediction unit.

22. The apparatus of claim 15, wherein the memory and the one or more processors form a video decoder housed within one of a mobile phone, a tablet computer, a laptop computer, a desktop computer, a set-top box, or a television.

23. The apparatus of claim 15, wherein to obtain the single set of motion information for the entirety of the prediction unit, the one or more processors are configured to receive the single set of motion information in the encoded video bitstream, and wherein to decode the prediction unit, the one or more processors are configured to decode the prediction unit according to a merge mode.

24. The apparatus of claim 15, wherein to obtain the single set of motion information for the entirety of the prediction unit, the one or more processors are configured to derive the single set of motion information, and wherein to decode the prediction unit, the one or more processors are configured to decode the prediction unit according to an advanced motion vector prediction (AMVP) mode.

25. An apparatus configured to decode video data, the apparatus comprising:
means for receiving, in an encoded video bitstream, residual data corresponding to a prediction unit of the video data that is encoded according to an asymmetric motion partitioning (AMP) mode, is uni-directionally predicted using backward view synthesis prediction (BVSP), and has a size of 16×12, 12×16, 16×4, or 4×16;
means for receiving, in the encoded video bitstream, data indicating that the prediction unit is uni-directionally predicted according to the BVSP;
means for obtaining a single set of motion information for an entirety of the prediction unit;
means for deriving a single disparity vector for the prediction unit based on the single set of motion information obtained for the entirety of the prediction unit;
means for partitioning the prediction unit according to the AMP mode to form a plurality of sub-blocks, each sub-block having a size of 8×4 or 4×8, and each sub-block having a respective set of motion information;
means for deriving a respective disparity vector for each sub-block of the plurality of sub-blocks from a corresponding depth block in a depth picture corresponding to a reference picture, wherein the means for deriving comprises means for deriving the respective disparity vector based on the prediction unit being uni-directionally predicted according to the BVSP, and wherein the means for deriving comprises means for deriving the respective disparity vector using the single set of motion information obtained for the entirety of the prediction unit;
means for synthesizing a respective reference block for each sub-block of the plurality of sub-blocks using the respective derived disparity motion vector; and
means for decoding the prediction unit by performing motion compensation on each of the sub-blocks using the residual data and the synthesized respective reference blocks.

26. The apparatus of claim 25, further comprising:
- means for receiving one or more syntax elements indicating that the prediction unit is encoded according to the AMP mode; and
- means for receiving a merge candidate index pointing to a BVSP candidate included in a merge candidate list.

27. The apparatus of claim 25, wherein the means for deriving the respective disparity motion vector for each sub-block comprises:
- means for locating the corresponding depth block for each sub-block of the plurality of sub-blocks using the single disparity vector derived for the prediction unit; and
- means for converting one selected depth value of the corresponding depth block for each sub-block of the plurality of sub-blocks to the respective disparity motion vector.

28. The apparatus of claim 25, wherein the prediction unit is a first prediction unit, and wherein the plurality of sub-blocks is a first plurality of sub-blocks, the apparatus further comprising:
- means for receiving residual data corresponding to a second prediction unit, wherein the second prediction unit is encoded using at least one of inter-view motion prediction or motion vector inheritance, and has a size of 16×4 or 4×16;
- means for partitioning the second prediction unit to form a second plurality of sub-blocks, each sub-block of the second plurality having a size of 8×4 or 4×8;
- means for deriving motion information for each sub-block of the second plurality of sub-blocks from one respective reference block; and
- means for decoding the second prediction unit by performing motion compensation on each sub-block of the second plurality of sub-blocks using the residual data, the derived motion information, and one reference picture list.

29. The apparatus of claim 28, wherein the means for performing the motion compensation comprises means for performing uni-directional motion compensation relative to a picture in the one reference picture list.

30. The apparatus of claim 25, wherein the prediction unit is a first prediction unit, and wherein the plurality of sub-blocks is a first plurality of sub-blocks, the apparatus further comprising:
- means for receiving residual data corresponding to a second prediction unit, wherein the second prediction unit is encoded using at least one of inter-view motion prediction or motion vector inheritance, and has a size of 16×12 or 12×16;
- means for partitioning the second prediction unit to form a second plurality of sub-blocks; and
- means for decoding each sub-block of the second plurality of sub-blocks with uni-predictive prediction.

* * * * *